US012704808B2

(12) United States Patent
Sato et al.

(10) Patent No.: US 12,704,808 B2
(45) Date of Patent: Aug. 11, 2026

(54) IMAGE FORMING APPARATUS INCLUDING COVER HAVING OPENING THAT ALLOWS TONER CARTRIDGE TO PASS THERETHROUGH BUT DOES NOT ALLOW DRUM CARTRIDGE TO PASS THERETHROUGH

(71) Applicant: BROTHER KOGYO KABUSHIKI KAISHA, Nagoya (JP)

(72) Inventors: Shougo Sato, Seto (JP); Miho Ishida, Nagoya (JP); Enao Yamada, Nagoya (JP); Shunsuke Ishii, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 19/059,602

(22) Filed: Feb. 21, 2025

(65) Prior Publication Data

US 2025/0189924 A1 Jun. 12, 2025

Related U.S. Application Data

(63) Continuation of application No. 18/328,986, filed on Jun. 5, 2023, now Pat. No. 12,259,678.

(30) Foreign Application Priority Data

Jun. 16, 2022 (JP) ................................ 2022-097635

(51) Int. Cl.

| | |
|---|---|
| ***G03G 15/00*** | (2006.01) |
| ***G03G 15/08*** | (2006.01) |
| ***G03G 21/16*** | (2006.01) |

(52) U.S. Cl.

CPC ..... *G03G 21/1633* (2013.01); *G03G 15/0872* (2013.01); *G03G 21/1609* (2013.01)

(58) Field of Classification Search

CPC ........... G03G 15/0872; G03G 21/1609; G03G 21/1633; G03G 21/1642

See application file for complete search history.

(56) References Cited

U.S. PATENT DOCUMENTS

| | | | |
|---|---|---|---|
| 2011/0182613 | A1 | 7/2011 | Kamimura et al. |
| 2011/0217075 | A1 | 9/2011 | Uehara et al. |

(Continued)

FOREIGN PATENT DOCUMENTS

| | | | |
|---|---|---|---|
| CN | 210666365 | U | 6/2020 |
| JP | 2007-219179 | A | 8/2007 |

(Continued)

*Primary Examiner* — Hoang X Ngo
(74) *Attorney, Agent, or Firm* — Merchant & Gould P.C.

(57) ABSTRACT

An image forming apparatus includes: a main casing; a first cover; a drum cartridge; and a toner cartridge. The main casing has a first opening. The first cover is movable between: a first closed position in which the first cover closes the first opening; and a first open position in which the first opening is opened. The drum cartridge includes a photosensitive drum. The drum cartridge is attachable to and detachable from the main casing through the first opening in a state where the first cover is in the first open position. The toner cartridge is configured to accommodate toner therein. The toner cartridge is attachable to and detachable from the drum cartridge. The first cover has a second opening smaller than the first opening. The second opening allows the toner cartridge to pass therethrough but does not allow the drum cartridge to pass therethrough.

8 Claims, 19 Drawing Sheets

1

(56) References Cited

U.S. PATENT DOCUMENTS

| | | | | |
|---|---|---|---|---|
| 2012/0160717 | A1 | 6/2012 | Sato | |
| 2015/0261176 | A1 | 9/2015 | Moon et al. | |
| 2019/0302676 | A1* | 10/2019 | Saeki | G03G 21/1842 |
| 2019/0302688 | A1* | 10/2019 | Abe | G03G 21/1864 |
| 2021/0096481 | A1* | 4/2021 | Fujii | G03G 15/0886 |

FOREIGN PATENT DOCUMENTS

| | | | |
|---|---|---|---|
| JP | 2008-304810 | A | 12/2008 |
| JP | 2011-150177 | A | 8/2011 |
| JP | 2011-186142 | A | 9/2011 |
| JP | 2012-137527 | A | 7/2012 |

* cited by examiner

IMAGE FORMING APPARATUS INCLUDING COVER HAVING OPENING THAT ALLOWS TONER CARTRIDGE TO PASS THERETHROUGH BUT DOES NOT ALLOW DRUM CARTRIDGE TO PASS THERETHROUGH

REFERENCE TO RELATED APPLICATIONS

This application is a continuation of U.S. patent application Ser. No. 18/328,986, filed Jun. 5, 2023, which further claims priority from Japanese Patent Application No. 2022-097635 filed on Jun. 16, 2022. The entire content of both applications is incorporated herein by reference.

BACKGROUND ART

A prior art discloses a conventional image forming apparatus including a main casing, a drum cartridge, and a toner cartridge. The main casing has an opening. The drum cartridge is attachable to and detachable from the main casing through the opening. The toner cartridge is attachable to and detachable from the drum cartridge both in a state where the drum cartridge is attached to the main casing and in a state where the drum cartridge is detached from the main casing.

DESCRIPTION

According to the conventional image forming apparatus, the opening of the main casing has a size that allows the drum cartridge to pass therethrough. With such a configuration, in a state where the drum cartridge is attached to the main casing and the toner cartridge is attached to the drum cartridge, there is a likelihood that the user detaches also the drum cartridge from the main casing through the opening by mistake in spite of the fact that the user intends to detach only the toner cartridge while leaving the drum cartridge in the main casing.

In view of the foregoing, it is an object of the present disclosure to provide an image forming apparatus that allows detachment of a toner cartridge while restraining detachment of the drum cartridge when the detachment of the drum cartridge from the main casing is not desired but the detachment of the toner cartridge is desired in a state where the drum cartridge is attached to a main casing and the toner cartridge is attached to the drum cartridge.

In order to attain the above and other object, the present disclosure provides an image forming apparatus including: a main casing; a first cover; a drum cartridge; and a toner cartridge. The main casing has a first opening. The first cover is movable between: a first closed position in which the first cover closes the first opening; and a first open position in which the first opening is opened. The drum cartridge includes a photosensitive drum. The drum cartridge is attachable to and detachable from the main casing through the first opening in a state where the first cover is in the first open position. The toner cartridge is configured to accommodate toner therein. The toner cartridge is attachable to and detachable from the drum cartridge. The first cover has a second opening smaller than the first opening. The second opening allows the toner cartridge to pass therethrough but does not allow the drum cartridge to pass therethrough.

In the above configuration, the second opening is smaller than the first opening, and the drum cartridge cannot pass through the second opening. Accordingly, the toner cartridge is allowed to be detached by the user through the second opening but the drum cartridge, which cannot pass through the second opening, is not allowed to be detached in a case where the user detaches the toner cartridge from the main casing in a state where the drum cartridge is attached to the main casing, the toner cartridge is attached to the drum cartridge, and the first cover is in the first closed position. Consequently, the toner cartridge can be detached from the main casing while avoiding inadvertent detachment of the drum cartridge.

According to another aspect, the present disclosure also provides an image forming apparatus including: a main casing; a first cover; a drum cartridge; a toner cartridge; and a second cover. The main casing has a first opening. The first cover is movable between: a first closed position in which the first cover closes the first opening; and a first open position in which the first opening is opened. The drum cartridge includes a photosensitive drum. The drum cartridge is attachable to and detachable from the main casing through the first opening in a state where the first cover is in the first open position. The toner cartridge is configured to accommodate toner therein. The toner cartridge is attachable to and detachable from the drum cartridge. The second cover is attached to the first cover. In a state where the first cover is in the first closed position, the second cover is movable between: a second closed position in which the second cover closes a part of the first opening; and a second open position in which the part of the first opening is opened. The part of the first opening has such a size that the part of the first opening allows the toner cartridge to pass therethrough but does not allow the drum cartridge to pass therethrough.

In the above configuration, the part of the first opening has a size such that the toner cartridge can pass through the part of the first opening but the drum cartridge cannot pass through the part of the first opening. Therefore, the toner cartridge is allowed to be detached by the user through the part of the first opening but the drum cartridge, which cannot pass through the part of the first opening, is not allowed to be detached in a case where the user detaches the toner cartridge from the main casing in a state where the drum cartridge is attached to the main casing, the toner cartridge is attached to the drum cartridge, and the first cover is in the first closed position. As a result, the toner cartridge can be detached while avoiding inadvertent detachment of the drum cartridge.

Hereinafter, one embodiment of the present disclosure will be described while referring to the accompanying drawings.

<1. Outline of Image Forming Apparatus 1>

Figure 1:
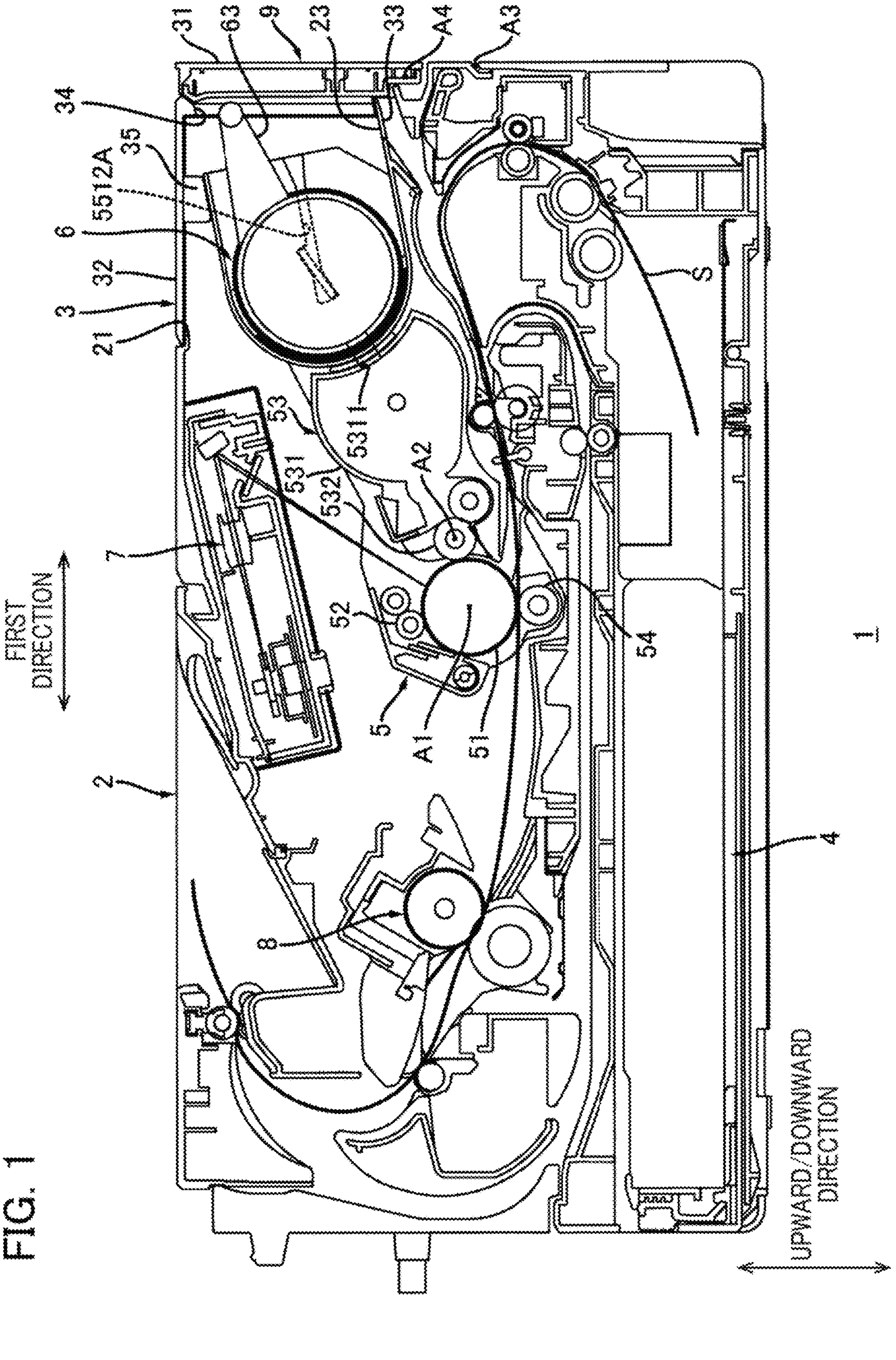
FIG. 1 is a cross-sectional view of an image forming apparatus.

An outline of an image forming apparatus 1 according to the embodiment will be described with reference to FIGS. 1 and 2. As illustrated in FIG. 1, the image forming apparatus 1 includes a main casing 2, a first cover 3, a sheet accommodating portion 4, a drum cartridge 5, a toner cartridge 6, an exposure unit 7, and a fixing unit 8.

<1.1 Main Casing 2>

The main casing 2 accommodates therein the sheet accommodating portion 4, the drum cartridge 5, the toner cartridge 6, the exposure unit 7, and the fixing unit 8. The main casing 2 has a first opening 21.

<1.2 First Cover 3>

Figure 2:
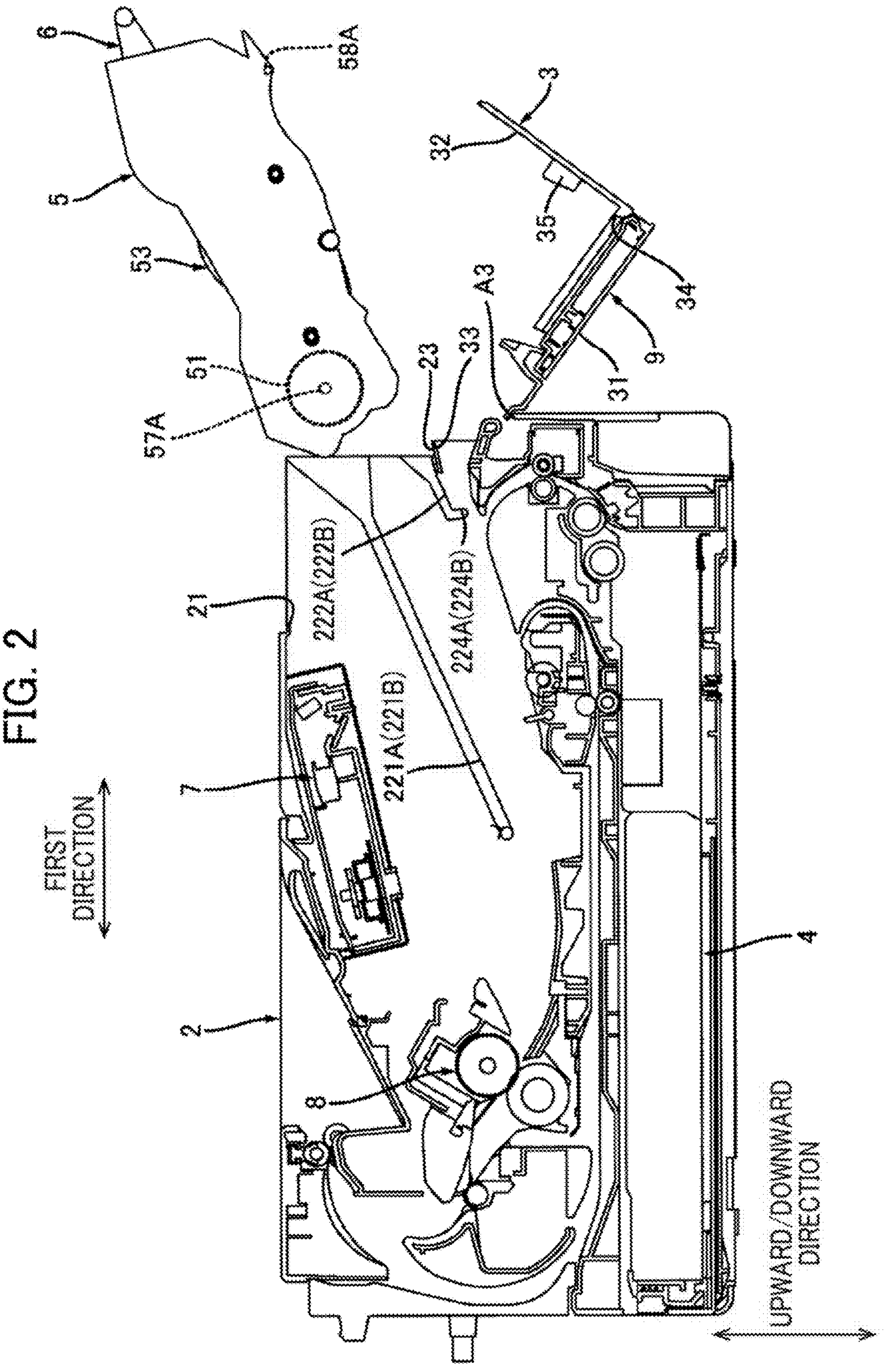
FIG. 2 is a cross-sectional view of the image forming apparatus, and particularly illustrating a state where a drum cartridge illustrated in FIG. 1 is detached from a main casing.

As illustrated in FIGS. 1 and 2, the first cover 3 is movable between a first closed position (see FIG. 1) and a first open position (see FIG. 2). Specifically, the first cover 3 is pivotally movable about a first axis A3 between the first closed position (see FIG. 1) and the first open position (see FIG. 2). As illustrated in FIG. 1, the first cover 3 closes the first opening 21 in a state where the first cover 3 is in the first closed position. As illustrated in FIG. 2, the first opening 21 is opened in a state where the first cover 3 is in the first open position.

<1.3 Sheet Accommodating Portion 4>

The sheet accommodating portion 4 is positioned at a lower end portion inside the main casing 2. As illustrated in FIG. 1, the sheet accommodating portion 4 is configured to accommodate therein a sheet(s) S. The sheet S inside the sheet accommodating portion 4 is conveyed toward a photosensitive drum 51 (described later).

<1.4 Drum Cartridge 5>

As illustrated in FIG. 2, the drum cartridge 5 is attachable to and detachable from the main casing 2 in a first direction through the first opening 21 in a state where the first cover 3 is in the first open position. The drum cartridge 5 includes the photosensitive drum 51, a charging roller 52, a developing unit 53, and a transfer roller 54.

<1.4.1 Photosensitive Drum 51>

The photosensitive drum 51 is rotatable about a drum axis A1. The drum axis A1 extends in a second direction. The second direction crosses the first direction in a state where the drum cartridge 5 is attached to the main casing 2. Preferably, the second direction is orthogonal to the first direction. The photosensitive drum 51 extends in the second direction and has a hollow cylindrical shape.

<1.4.2 Charging Roller 52>

The charging roller 52 is configured to charge a circumferential surface of the photosensitive drum 51. The charging roller 52 contacts the circumferential surface of the photosensitive drum 51.

<1.4.3 Developing Unit 53>

The developing unit 53 includes a developing casing 531, and a developing roller 532.

The developing casing 531 is configured to accommodate toner therein. The developing casing 531 supports the developing roller 532.

The developing roller 532 is configured to supply the toner accommodated in the developing casing 531 to the photosensitive drum 51. The developing roller 532 contacts the circumferential surface of the photosensitive drum 51. The developing roller 532 may be configured to separate from the photosensitive drum 51. The developing roller 532 is rotatable about a developing axis A2 extending in the second direction. The developing roller 532 extends in the second direction, and has a hollow cylindrical shape.

<1.4.4 Transfer Roller 54>

The transfer roller 54 is configured to transfer the toner from the circumferential surface of the photosensitive drum 51 to the sheet S. The transfer roller 54 contacts the circumferential surface of the photosensitive drum 51. Specifically, the sheet S supplied from the sheet accommodating portion 4 passes between the photosensitive drum 51 and the transfer roller 54. At this time, the transfer roller 54 transfers the toner carried on the circumferential surface of the photosensitive drum 51 to the sheet S.

<1.5 Toner Cartridge 6>

The toner cartridge 6 is configured to accommodate toner therein. The toner cartridge 6 is attachable to and detachable from the drum cartridge 5. The toner accommodated in the toner cartridge 6 is supplied to the developing casing 531 in a state where the toner cartridge 6 is attached to the drum cartridge 5.

<1.6 Exposure Unit 7>

The exposure unit 7 is configured to expose the circumferential surface of the photosensitive drum 51 charged by the charging roller 52 to light in a state where the drum cartridge 5 is attached to the main casing 2. The developing unit 53 described above supplies the toner to the exposed circumferential surface of the photosensitive drum 51. In the present embodiment, the exposure unit 7 is a laser scanner unit. An LED exposure head is available as the exposure unit 7.

<1.7 Fixing Unit 8>

The fixing unit 8 is configured to fix, to the sheet S, toner that has been transferred onto the sheet S. The sheet S that has passed through the fixing unit 8 is discharged on an upper surface of the main casing 2.

<2. Details of Drum Cartridge 5>

The drum cartridge 5 will next be described in detail with reference to FIGS. 3 through 7.

Figure 3:
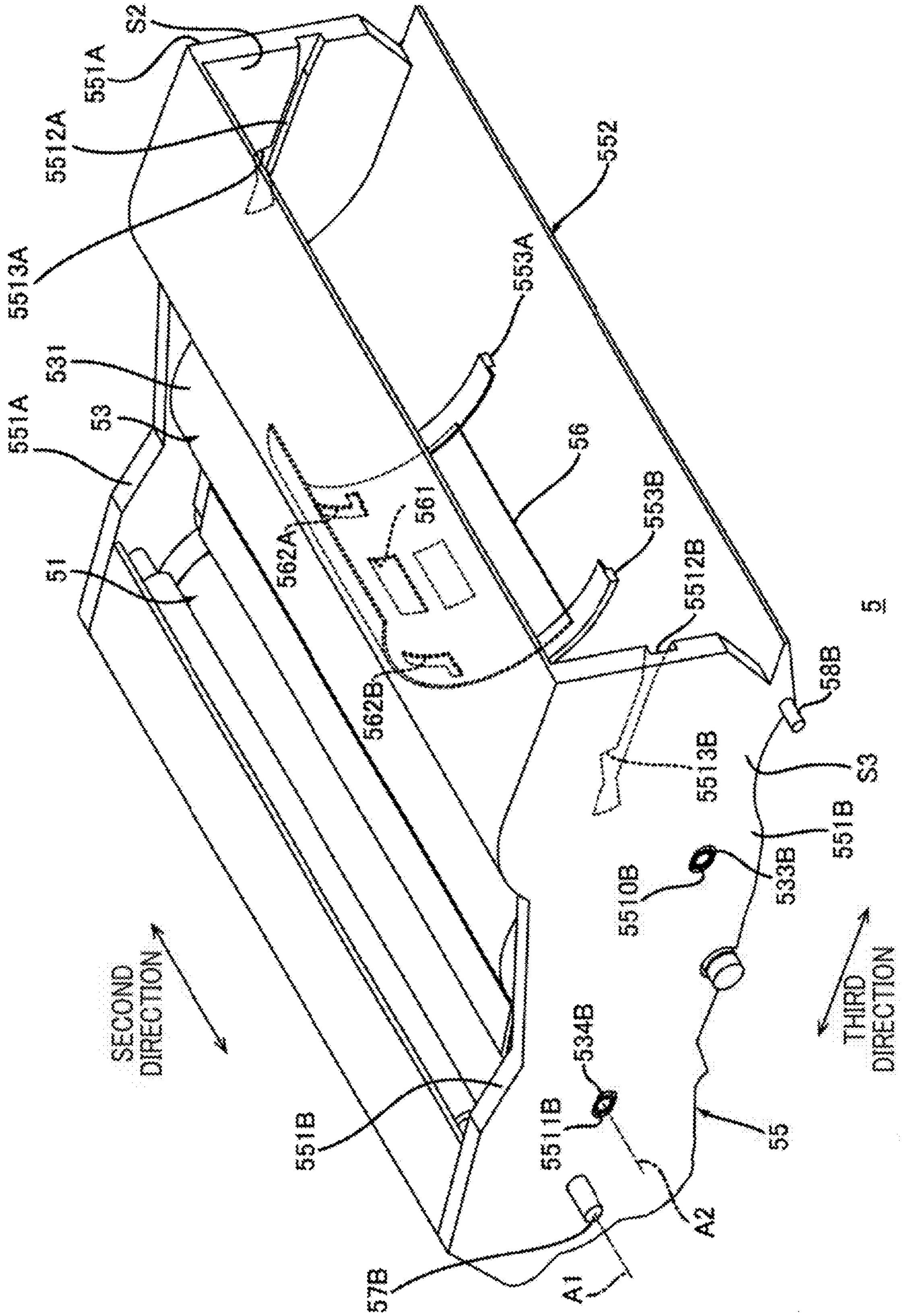
FIG. 3 is a perspective view of the drum cartridge illustrated in FIG. 2.

As illustrated in FIG. 3, the drum cartridge 5 further includes a drum frame 55, a developing shutter 56, two protrusions 57A (see FIG. 4) and 57B, and two protrusions 58A (see FIG. 4) and 58B in addition to the photosensitive drum 51, the charging roller 52 (see FIG. 5), the developing unit 53, and the transfer roller 54 (see FIG. 5) those are described above.

<2.1 Drum Frame 55>

Figure 5:
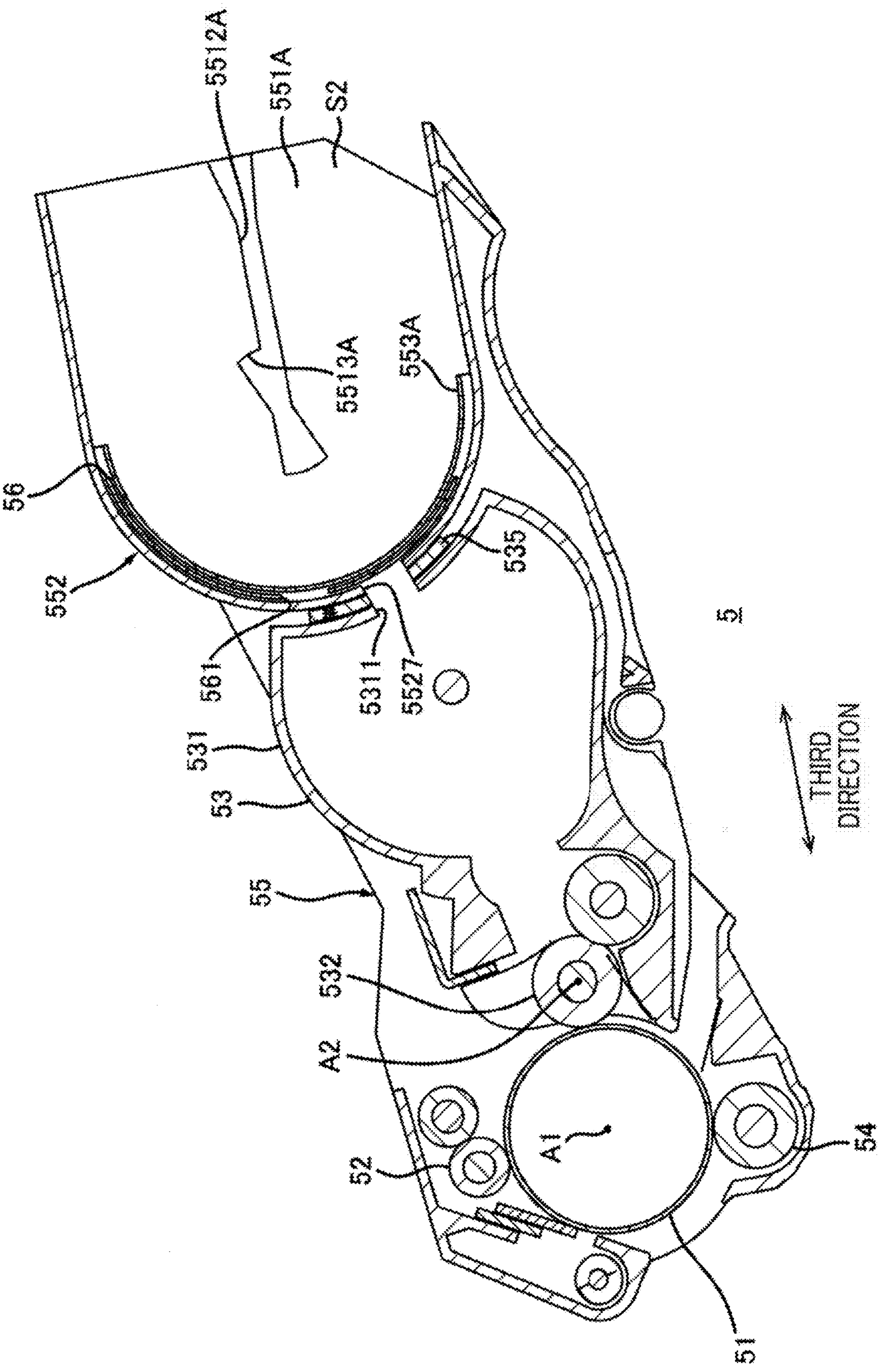
FIG. 5 is a cross-sectional view of the drum cartridge illustrated in FIG. 3.

The drum frame 55 supports the photosensitive drum 51, the charging roller 52 (see FIG. 5), the developing unit 53, and the transfer roller 54 (see FIG. 5). The drum frame 55 includes two drum side plates 551A and 551B, and a support portion 552.

<2.1.1 Drum Side Plates 551A and 551B>

Figure 4:
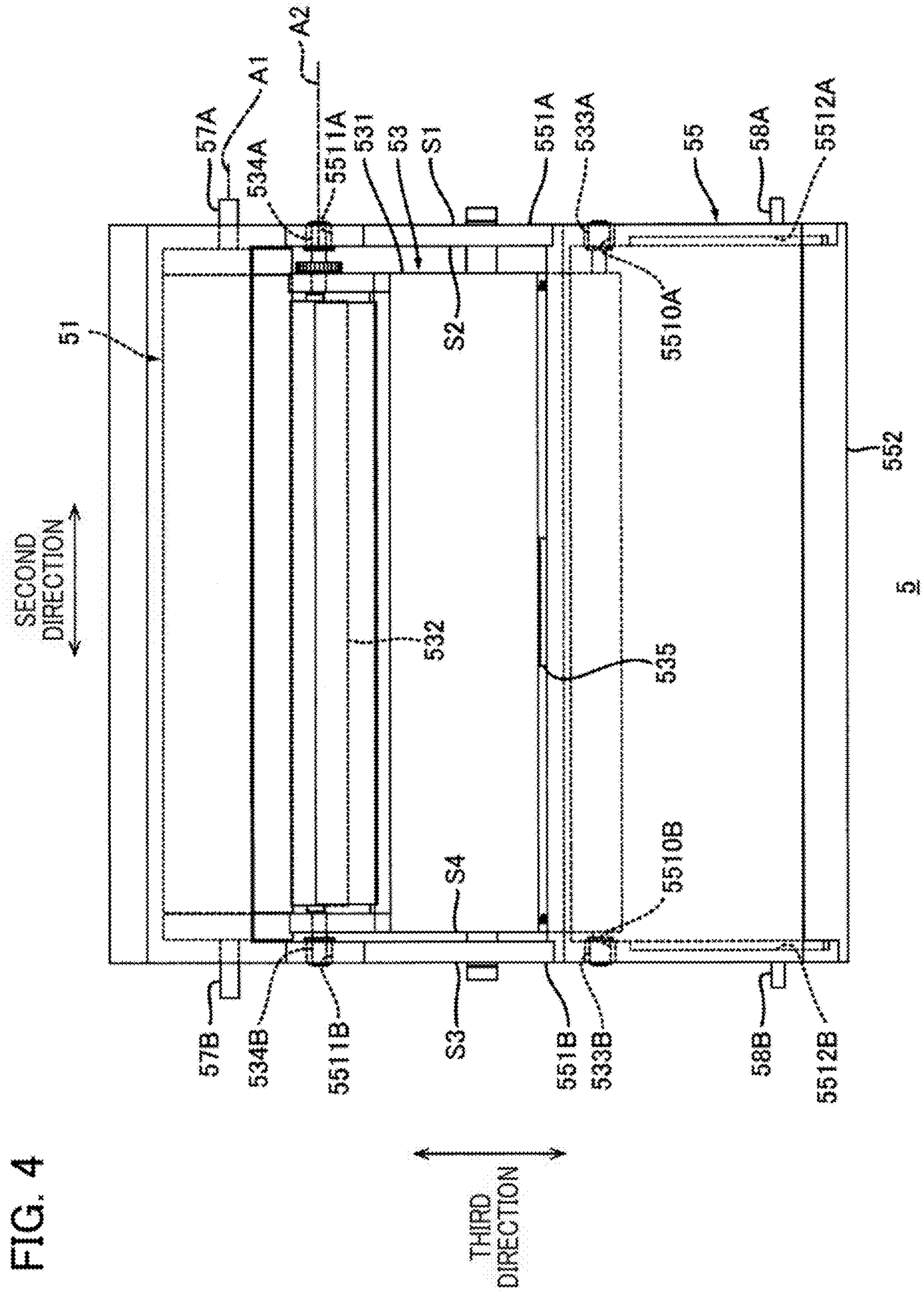
FIG. 4 is a plan view of the drum cartridge illustrated in FIG. 3.

The drum side plate 551A constitutes one end portion in the second direction of the drum frame 55. The drum side plate 551A extends in a direction crossing the second direction. Preferably, the drum side plate 551A extends in a direction orthogonal to the second direction. The drum side plate 551A has an outer surface S1 (see FIG. 4), and an inner surface S2. The drum side plate 551A supports the photosensitive drum 51, the charging roller 52 (see FIG. 5), the developing unit 53, and the transfer roller 54 (see FIG. 5) in cooperation with the drum side plate 551B. As illustrated in FIG. 4, the drum side plate 551A further has two through-holes 5510A and 5511A, a guide portion 5512A, and a locking portion 5513A (see FIG. 3).

The through-hole 5510A is positioned to be spaced apart from the photosensitive drum 51 in a third direction. The third direction is a direction connecting the drum axis A1 and the developing axis A2 to each other. The third direction is orthogonal to the second direction. The third direction may be coincident with the first direction, or may be different from the first direction. The through-hole 5510A is an elongated hole that is elongated in the third direction.

The through-hole 5511A is positioned between the photosensitive drum 51 and the through-hole 5510A in the third direction. The through-hole 5511A is an elongated hole. The through-hole 5511A is elongated in the third direction.

The guide portion 5512A is positioned at the inner surface S2 of the drum side plate 551A. In the present embodiment, the guide portion 5512A is a groove. The guide portion 5512A extends in the third direction. The guide portion 5512A may extend in a direction crossing the third direction.

As illustrated in FIG. 5, the locking portion 5513A is positioned at one end portion in the third direction of the guide portion 5512A. In the present embodiment, the locking portion 5513A is a groove. The locking portion 5513A extends in a direction crossing the guide portion 5512A.

In a state where the toner cartridge 6 is attached to the drum cartridge 5 and a handle 63 (described later) of the toner cartridge 6 is in its first position (see FIG. 12), a protrusion 64A (described later; see FIG. 9) of the toner cartridge 6 is fitted in the locking portion 5513A. In a state where the toner cartridge 6 is attached to the drum cartridge 5 and the handle 63 is in its second position (see FIG. 11), the protrusion 64A is disengaged from the locking portion 5513A.

As illustrated in FIG. 4, the drum side plate 551B constitutes another end portion in the second direction of the drum frame 55. The drum side plate 551B is positioned to be spaced apart from the drum side plate 551A in the second direction. The drum side plate 551B extends in a direction crossing the second direction. Preferably, the drum side plate 551B extends in a direction orthogonal to the second direction. The drum side plate 551B has an outer surface S3, and an inner surface S4. The drum side plate 551B also has two through-holes 5510B and 5511B, a guide portion 5512B, and a locking portion 5513B (see FIG. 3).

The through-hole 5510B is spaced apart from the photosensitive drum 51 in the third direction. The through-hole 5510B is an elongated hole. The through-hole 5510B is elongated in the third direction.

The through-hole 5511B is positioned between the photosensitive drum 51 and the through-hole 5510B in the third direction. The through-hole 5511B is an elongated hole. The through-hole 5511B is elongated in the third direction.

The guide portion 5512B is positioned at the inner surface S4 of the drum side plate 551B. In the present embodiment, the guide portion 5512B is a groove. The guide portion 5512B extends in a direction coincident with a direction in which the guide portion 5512A extends.

As illustrated in FIG. 3, the locking portion 5513B is positioned at one end portion in the third direction of the guide portion 5512B. In the present embodiment, the locking portion 5513B is a groove. The locking portion 5513B extends in a direction coincident with a direction in which the locking portion 5513A extends.

In a state where the toner cartridge 6 is attached to the drum cartridge 5 and the handle 63 is in the first position (see FIG. 12), a protrusion 64B (described later; see FIG. 9) of the toner cartridge 6 is fitted in the locking portion 5513B. In a state where the toner cartridge 6 is attached to the drum cartridge 5 and the handle 63 is in the second position (see FIG. 11), the protrusion 64B is disengaged from the locking portion 5513B.

<2.1.2 Support Portion 552>

The support portion 552 is configured to support a toner casing 61 (see FIG. 8) of the toner cartridge 6. The toner casing 61 will be described later.

The support portion 552 extends in the second direction. The support portion 552 has one end portion in the second direction connected to the drum side plate 551A, and has another end portion in the second direction connected to the drum side plate 551B.

Figure 6:
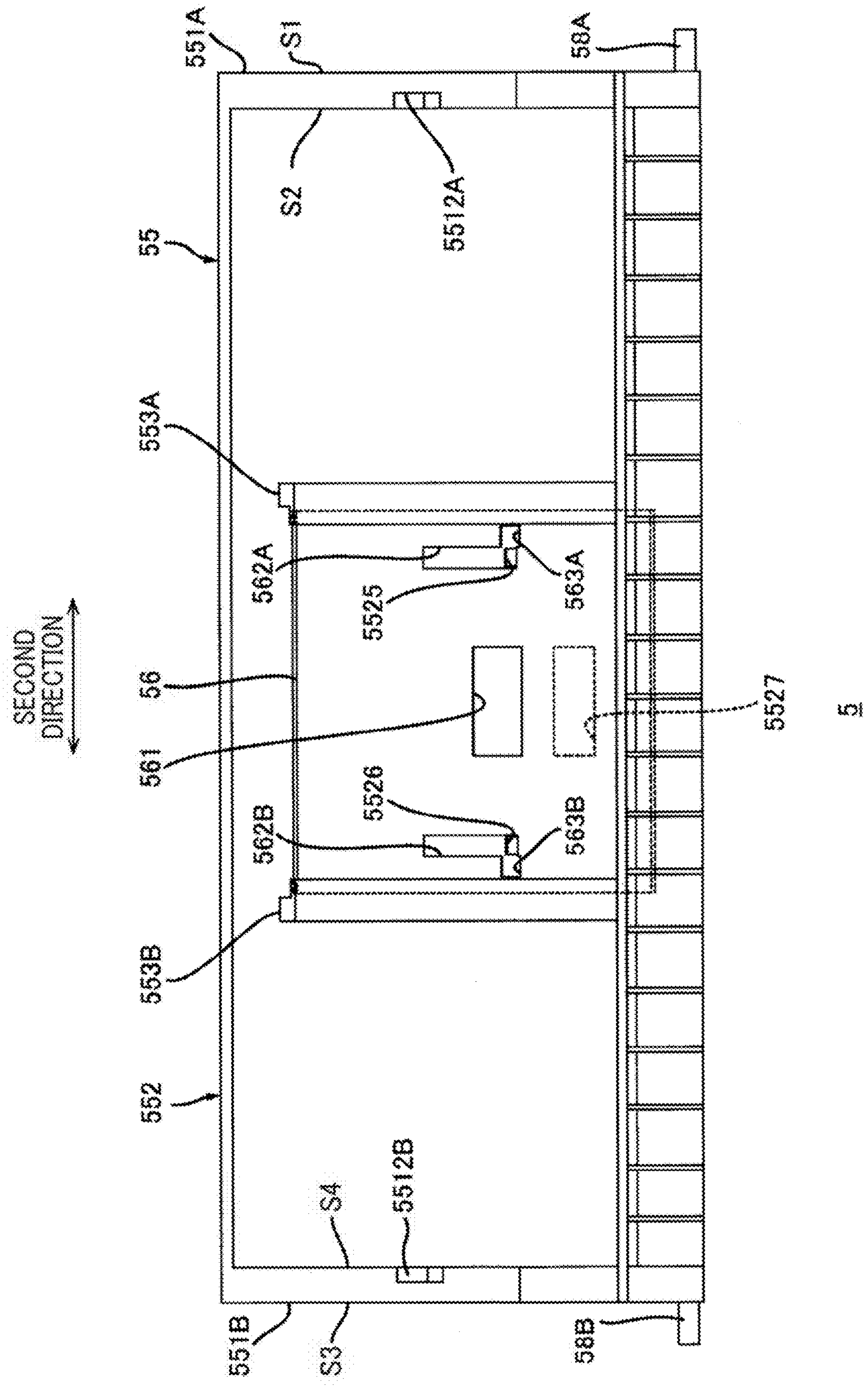
FIG. 6 is a front view of the drum cartridge illustrated in FIG. 3.

As illustrated in FIG. 6, the support portion 552 has an opening 5527, two recessed portions 5525 and 5526, and two guide portions 553A and 553B.

The opening 5527 is formed at a center portion in the second direction of the support portion 552. The opening 5527 is positioned between the recessed portion 5525 and the recessed portion 5526. The opening 5527 is also positioned between the guide portion 553A and the guide portion 553B in the second direction. As illustrated in FIG. 5, the opening 5527 is positioned between the developing casing 531, and the two locking portions 5513A and 5513B (see FIG. 3) in the third direction. The opening 5527 is in communication with an inlet opening 5311 (described later) of the developing casing 531.

As illustrated in FIG. 6, the recessed portion 5525 is positioned between the opening 5527 and the drum side plate 551A in the second direction. The recessed portion 5525 is positioned between the opening 5527 and the guide portion 553A in the second direction.

The recessed portion 5526 is positioned between the opening 5527 and the drum side plate 551B in the second direction. The recessed portion 5526 is positioned on the opposite side of the opening 5527 from the recessed portion 5525 in the second direction. The recessed portion 5526 is positioned between the opening 5527 and the guide portion 553B in the second direction.

As illustrated in FIG. 3, each of the two guide portions 553A and 553B is configured to guide the developing shutter 56.

As illustrated in FIG. 6, the guide portion 553A is positioned between the opening 5527 and the drum side plate 551A in the second direction. The guide portion 553A is positioned between the recessed portion 5525 and the drum side plate 551A in the second direction. The guide portion 553A extends in a direction coincident with a direction in which the developing shutter 56 (described later) extends.

The guide portion 553B is positioned between the opening 5527 and the drum side plate 551B in the second direction. The guide portion 553B is positioned on the opposite side of the recessed portion 5526 from the recessed portion 5525 in the second direction. The guide portion 553B is positioned on the opposite side of the recessed portion 5526 from the opening 5527 in the second direction. The guide portion 553B also extends in the direction coincident with the direction in which the developing shutter 56 extends.

<2.2 Details of Developing Unit 53>

As illustrated in FIG. 4, the developing unit 53 further includes a sealing member 535, two protrusions 533A and 534A, and two protrusions 533B and 534B in addition to the developing casing 531 and the developing roller 532 described above.

<2.2.1 Details of Developing Casing 531>

As illustrated in FIG. 5, the developing casing 531 is positioned between the photosensitive drum 51 and the support portion 552 in the third direction. The developing casing 531 extends in the second direction. The developing casing 531 has the inlet opening 5311.

The inlet opening 5311 is formed at a center portion in the second direction of the developing casing 531. As described above, the inlet opening 5311 is in communication with the opening 5527 of the support portion 552. Thus, the inlet opening 5311 is configured to allow the toner supplied from the toner cartridge 6 through the opening 5527 of the support portion 552 to be introduced into the developing casing 531 therethrough. The inlet opening 5311 is positioned to be spaced apart from the developing roller 532 in the third direction.

<2.2.2 Sealing Member 535>

The sealing member 535 is interposed between the developing casing 531 and the support portion 552 in the third direction. The sealing member 535 is positioned around the inlet opening 5311 and the opening 5527. The sealing member 535 seals a gap between the developing casing 531 and the support portion 552. The sealing member 535 is elastically deformable in accordance with movement of the developing unit 53 relative to the photosensitive drum 51. Accordingly, when the developing unit 53 is moved relative to the photosensitive drum 51, the sealing member 535 prevents the toner from leaking out through the gap between the developing casing 531 and the support portion 552. The sealing member 535 is made of sponge, for example.

<2.2.3 Protrusions 533A and 534A>

As illustrated in FIG. 4, the protrusion 533A is positioned away from the drum axis A1 in the third direction. The protrusion 533A is positioned on one end surface in the second direction of the developing casing 531. The protrusion 533A extends from the one end surface in the second direction of the developing casing 531. Note that the protrusion 533A may be attached to the one end surface in the second direction of the developing casing 531. The protrusion 533A has a solid cylindrical shape and extends in the second direction. The protrusion 533A is fitted in the through-hole 5510A in the drum side plate 551A.

The protrusion 534A is positioned between the drum axis A1 and the protrusion 533A in the third direction. The protrusion 534A serves as one end portion of a shaft of the developing roller 532. The protrusion 534A may extend in the second direction from the one end surface of the developing casing 531. As another modification, the protrusion 534A may be attached to the one end surface in the second direction of the developing casing 531. The protrusion 534A has a solid cylindrical shape. The protrusion 534A extends in the second direction. The protrusion 534A is fitted in the through-hole 5511A in the drum side plate 551A.

<2.2.4 Protrusions 533B and 534B>

The protrusion 533B is positioned away from the drum axis A1 in the third direction. The protrusion 533B is positioned on another end surface in the second direction of the developing casing 531. Specifically, the protrusion 533B extends from the other end surface in the second direction of the developing casing 531. The protrusion 533B may be attached to the other end surface in the second direction of the developing casing 531. The protrusion 533B has a solid cylindrical shape, and extends in the second direction. The protrusion 533B is fitted in the through-hole 5511B formed in the drum side plate 551B.

The protrusion 534B is positioned between the drum axis A1 and the protrusion 533B in the third direction. The protrusion 534B serves as another end portion of the shaft of the developing roller 532. The protrusion 534B may extend from the other end surface in the second direction of the developing casing 531. Alternatively, the protrusion 534B may be attached to the other end surface in the second direction of the developing casing 531. The protrusion 534B has a solid cylindrical shape and extends in the second direction. The protrusion 534B is fitted in the through-hole 5511B in the drum side plate 551B.

The developing unit 53 is movable relative to the photosensitive drum 51 in the third direction by virtue of fitting engagement of the protrusion 533A, the protrusion 534A, the protrusion 533B, and the protrusion 534B with the through-hole 5510A, the through-hole 5511A, the through-hole 5510B, and the through-hole 5511B, respectively.

<2.3 Developing Shutter 56>

As illustrated in FIG. 5, the developing shutter 56 is configured to open and close the inlet opening 5311 of the developing unit 53. Specifically, the developing shutter 56 is movable between a closed position (see FIG. 5) in which the developing shutter 56 closes the inlet opening 5311 and an open position (see FIG. 7) in which the inlet opening 5311 is opened.

The developing shutter 56 extends along the support portion 552. As illustrated in FIG. 6, the developing shutter 56 is provided at the center portion in the second direction of the support portion 552. The developing shutter 56 extends in the second direction. The developing shutter 56 has one end portion in the second direction fitted in the guide portion 553A, and another end portion in the second direction fitted in the guide portion 553B.

Figure 7:
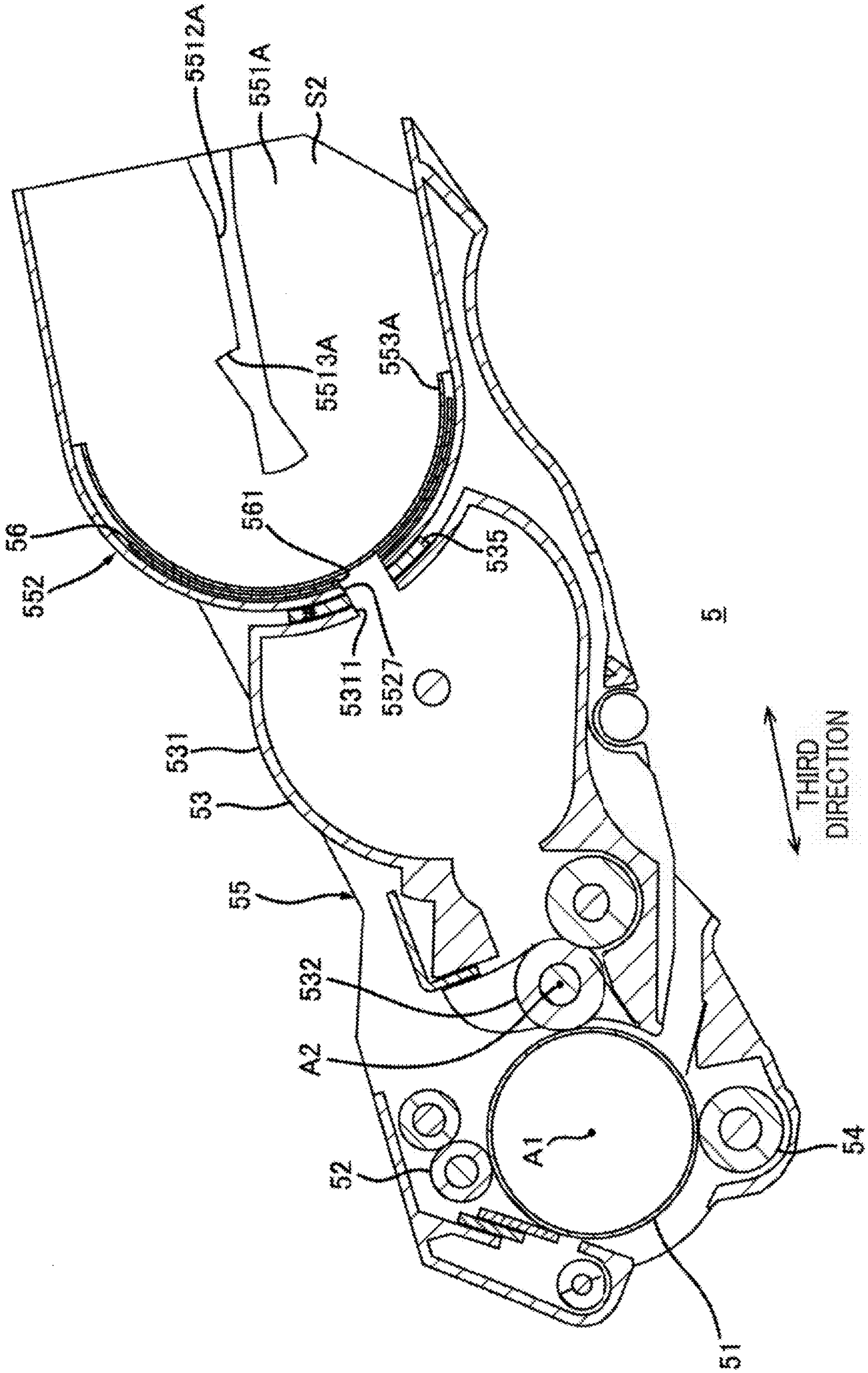
FIG. 7 is a cross-sectional view of the drum cartridge illustrated in FIG. 5, and particularly illustrating a state where a developing shutter is in its open position.

The developing shutter 56 is guided by the guide portion 553A and the guide portion 553B so as to be movable between the closed position (see FIG. 5) and the open position (see FIG. 7). The developing shutter 56 has a developing shutter opening 561, two slits 562A and 562B, and two engagement portions 563A and 563B.

<2.3.1 Developing Shutter Opening 561>

The developing shutter opening 561 is formed at a center portion in the second direction of the developing shutter 56. As illustrated in FIG. 5, the developing shutter opening 561 is positioned away from the inlet opening 5311 of the developing unit 53 in a state where the developing shutter 56 is in the closed position. That is, the developing shutter opening 561 is not in communication with the inlet opening 5311 in a state where the developing shutter 56 is in the closed position. Therefore, the developing shutter 56 closes the inlet opening 5311.

As illustrated in FIG. 7, the developing shutter opening 561 is in communication with the inlet opening 5311 in a state where the developing shutter 56 is in the open position. As a result, the inlet opening 5311 is opened.

<2.3.2 Slits 562A and 562B>

As illustrated in FIG. 6, the slit 562A is provided at one end portion in the second direction of the developing shutter 56. The slit 562A is positioned between the developing shutter opening 561 and the drum side plate 551A in the second direction. The slit 562A is positioned between the developing shutter opening 561 and the guide portion 553A in the second direction. The recessed portion 5525 of the support portion 552 is positioned within the slit 562A. As illustrated in FIG. 3, the slit 562A extends in a direction in which the guide portion 553A extends.

As illustrated in FIG. 6, the slit 562B is provided at another end portion in the second direction of the developing shutter 56. The slit 562B is positioned between the developing shutter opening 561 and the drum side plate 551B in the second direction. The slit 562B is positioned on the opposite side of the developing shutter opening 561 from the slit 562A in the second direction. The slit 562B is positioned between the developing shutter opening 561 and the guide portion 553B in the second direction. The slit 562B is positioned on the opposite side of the developing shutter opening 561 from the guide portion 553A in the second direction. The recessed portion 5526 of the support portion 552 is positioned within the slit 562B. As illustrated in FIG. 3, the slit 562B extends in a direction in which the guide portion 553B extends.

<2.3.3 Engagement Portions 563A and 563B>

As illustrated in FIG. 6, the engagement portion 563A is positioned at the one end portion in the second direction of the developing shutter 56. The engagement portion 563A is positioned between the developing shutter opening 561 and the drum side plate 551A in the second direction. Further, the engagement portion 563A is positioned between the developing shutter opening 561 and the guide portion 553A in the second direction. The engagement portion 563A engages with a protrusion 65A (see FIG. 8; described later) of the toner cartridge 6 in a state where the toner cartridge 6 is attached to the drum cartridge 5. In the present embodiment, the engagement portion 563A is a through-hole.

The engagement portion 563B is positioned at the other end portion in the second direction of the developing shutter 56. The engagement portion 563B is positioned between the developing shutter opening 561 and the drum side plate 551B in the second direction. The engagement portion 563B is positioned on the opposite side of the developing shutter opening 561 from the engagement portion 563A in the second direction. The engagement portion 563B is positioned between the developing shutter opening 561 and the guide portion 553B in the second direction. The engagement portion 563B engages with a protrusion 65B (see FIG. 8; described later) of the toner cartridge 6 in a state where the toner cartridge 6 is attached to the drum cartridge 5. In the present embodiment, the engagement portion 563B is a through-hole.

<2.4 Protrusions 57A and 57B>

As illustrated in FIG. 4, the protrusion 57A is positioned at one end portion in the second direction of the drum cartridge 5. The protrusion 57A is positioned on the opposite side of the drum side plate 551A from the drum side plate 551B in the second direction. The protrusion 57A extends in the second direction. The protrusion 57A has a solid cylindrical shape. The protrusion 57A serves as one end portion in the second direction of a shaft of the photosensitive drum 51. The protrusion 57A may extend from the drum side plate 551A. The protrusion 57A may attached to the drum side plate 551A.

The protrusion 57B is positioned at another end portion in the second direction of the drum cartridge 5. The protrusion 57B is positioned on the opposite side of the drum side plate 551B from the drum side plate 551A in the second direction. The protrusion 57B has a shape identical to that of the protrusion 57A. The protrusion 57B serves as another end portion in the second direction of the shaft of the photosensitive drum 51. The protrusion 57B may extend from the drum side plate 551B. The protrusion 57B may be attached to the drum side plate 551B.

<2.5 Protrusions 58A and 58B>

The protrusion 58A is positioned at the one end portion in the second direction of the drum cartridge 5. The protrusion 58A is positioned on the opposite side of the drum side plate 551A from the drum side plate 551B in the second direction. The protrusion 58A is positioned on the outer surface S1 of the drum side plate 551A. The protrusion 58A extends from the outer surface S1. Note that the protrusion 58A may be attached to the outer surface S1. The protrusion 58A is positioned away from the protrusion 57A in the third direction. The protrusion 58A extends in the second direction. The protrusion 58A has a solid cylindrical shape.

The protrusion 58B is positioned at the other end portion in the second direction of the drum cartridge 5. The protrusion 58B is positioned on the opposite side of the drum side plate 551B from the drum side plate 551A in the second direction. The protrusion 58B is positioned on the outer surface S3 of the drum side plate 551B. The protrusion 58B extends from the outer surface S3. The protrusion 58B may be attached to the outer surface S3. The protrusion 58B is positioned away from the protrusion 57B in the third direction. The protrusion 58B extends in the second direction. The protrusion 58B has a shape identical to that of the protrusion 58A.

<3. Details of Toner Cartridge 6>

Next, the toner cartridge 6 will be described in detail with reference to FIGS. 8 through 12.

In the following description as to the toner cartridge 6, "the second direction" is based on a state where the toner cartridge 6 is attached to the drum cartridge 5.

Figure 8:
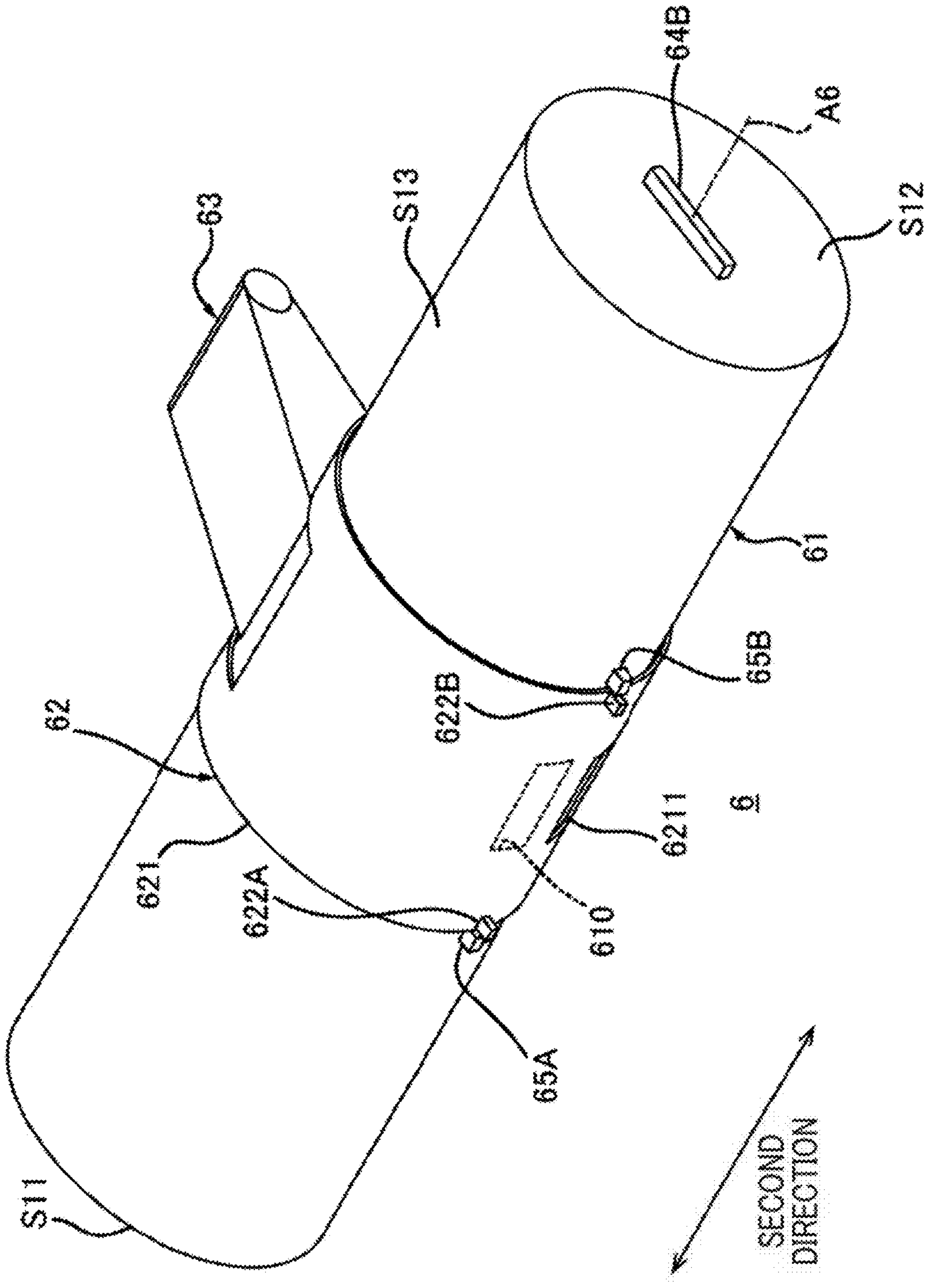
FIG. 8 is a perspective view of a toner cartridge.

As illustrated in FIG. 8, the toner cartridge 6 includes the toner casing 61, the two protrusions 64A (see FIG. 9) and 64B, the two protrusions 65A and 65B, a toner shutter 62, and the handle 63.

<3.1 Toner Casing 61>

The toner casing 61 is configured to accommodate toner therein. The toner casing 61 extends in the second direction. The toner casing 61 has a hollow cylindrical shape. The toner casing 61 has one side surface S11 in the second direction, another side surface S12 in the second direction, and a peripheral surface S13. The peripheral surface S13 is positioned between the one side surface S11 and the other side surface S12 in the second direction. The toner casing 61 has a discharge opening 610. The discharge opening 610 allows the toner accommodated in the toner casing 61 to be discharged therethrough. The discharge opening 610 is formed at a center portion in the second direction of the toner casing 61.

<3.2 Protrusions 64A and 64B>

Figure 9:
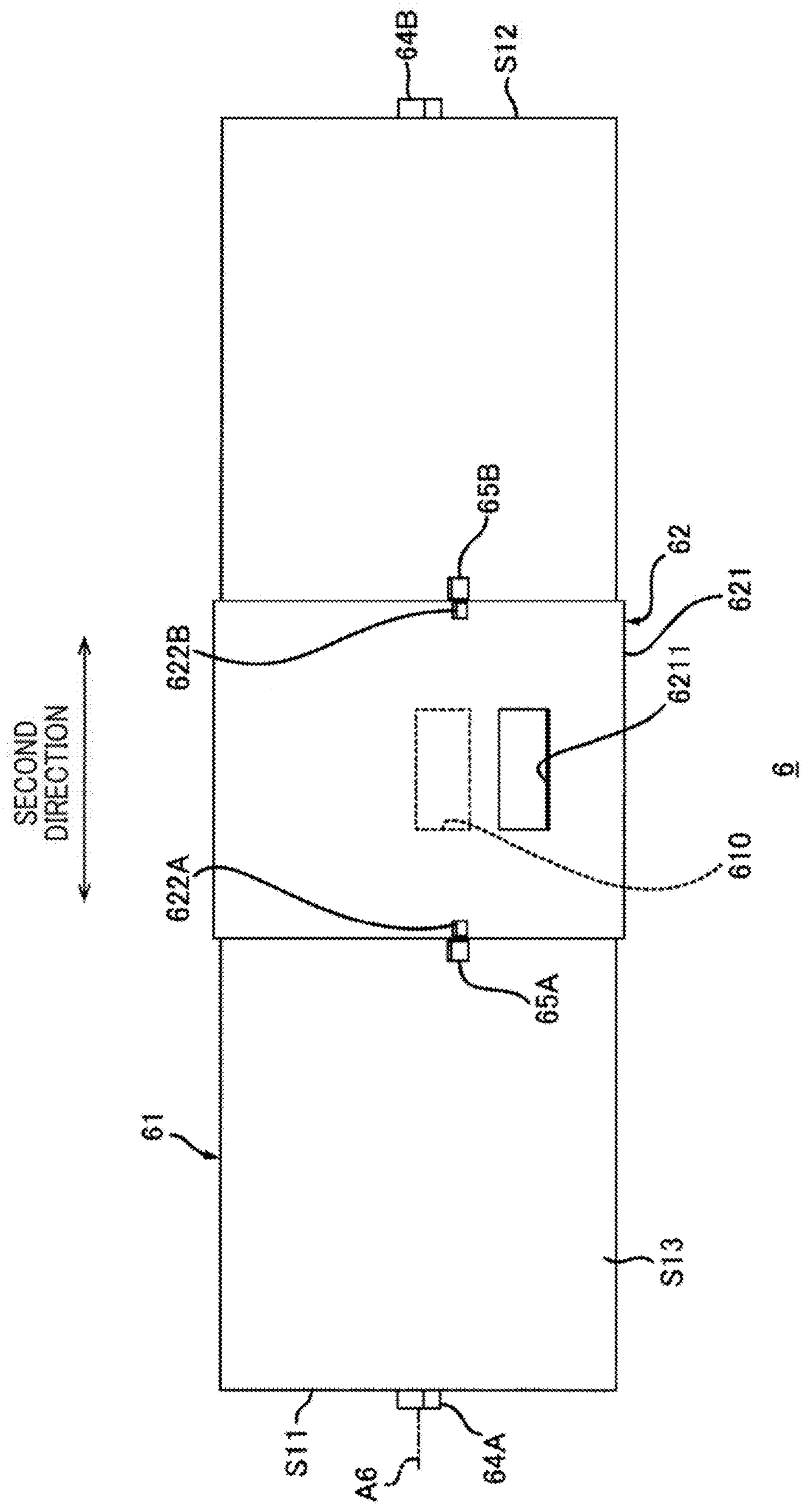
FIG. 9 is a rear view of the toner cartridge illustrated in FIG. 8.

As illustrated in FIG. 9, the protrusion 64A is positioned at one end portion in the second direction of the toner casing 61. The protrusion 64A is positioned on the one side surface S11 of the toner casing 61. In the present embodiment, the protrusion 64A extends from the one side surface S11. The protrusion 64A may be attached to the one side surface S11. The protrusion 64A extends in a direction orthogonal to the second direction.

The protrusion 64B is positioned at another end portion in the second direction of the toner casing 61. The protrusion 64B is positioned away from the protrusion 64A in the second direction. In the present embodiment, the protrusion 64B extends from the other side surface S12. The protrusion 64B may be attached to the other side surface S12. As illustrated in FIG. 8, the protrusion 64B extends in a direction orthogonal to the second direction.

<3.3 Protrusions 65A and 65B>

Figure 10:
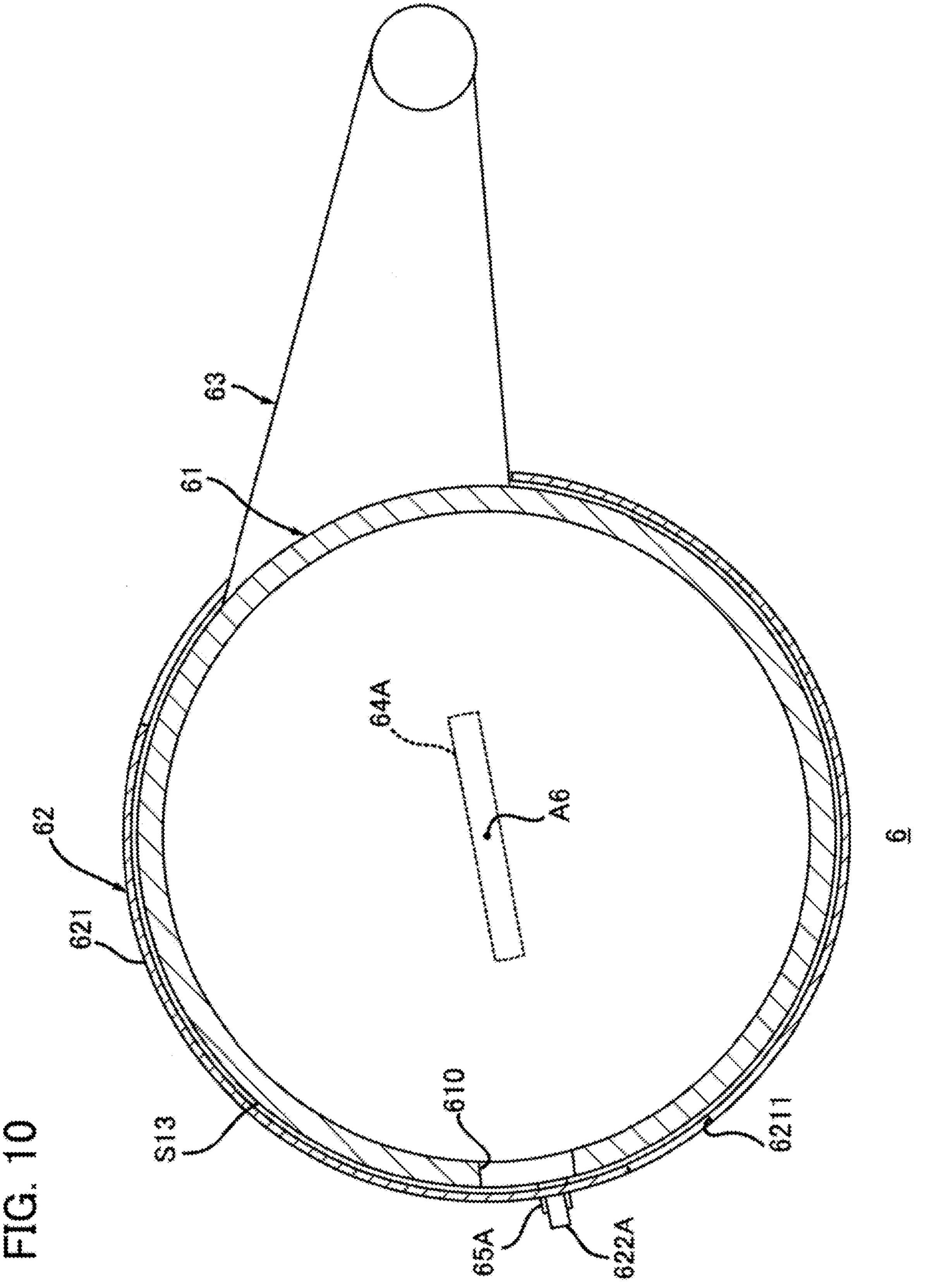
FIG. 10 is a cross-sectional view of the toner cartridge illustrated in FIG. 8.

The protrusion 65A is positioned on the peripheral surface S13 of the toner casing 61. The protrusion 65A is positioned between the one side surface S11 and the discharge opening 610 of the toner casing 61 in the second direction. In other words, the protrusion 65A is positioned between the one side surface S11 and the toner shutter 62 in the second direction. The protrusion 65A extends from the peripheral surface S13. The protrusion 65A may be attached to the peripheral surface S13. As illustrated in FIG. 10, the protrusion 65A extends in a radial direction of the toner casing 61.

As illustrated in FIG. 9, the protrusion 65B is also positioned on the peripheral surface S13 of the toner casing 61. The protrusion 65B is positioned between the discharge opening 610 of the toner casing 61 and the other side surface S12 in the second direction. In other words, the protrusion 65B is positioned between the other side surface S12 and the toner shutter 62 in the second direction. The protrusion 65B is positioned on the opposite side of the protrusion 65A from the one side surface S11 in the second direction. The protrusion 65B extends from the peripheral surface S13. The protrusion 65B may be attached to the peripheral surface S13. The protrusion 65B extends in the radial direction of the toner casing 61.

<3.4 Toner Shutter 62>

Figure 11:
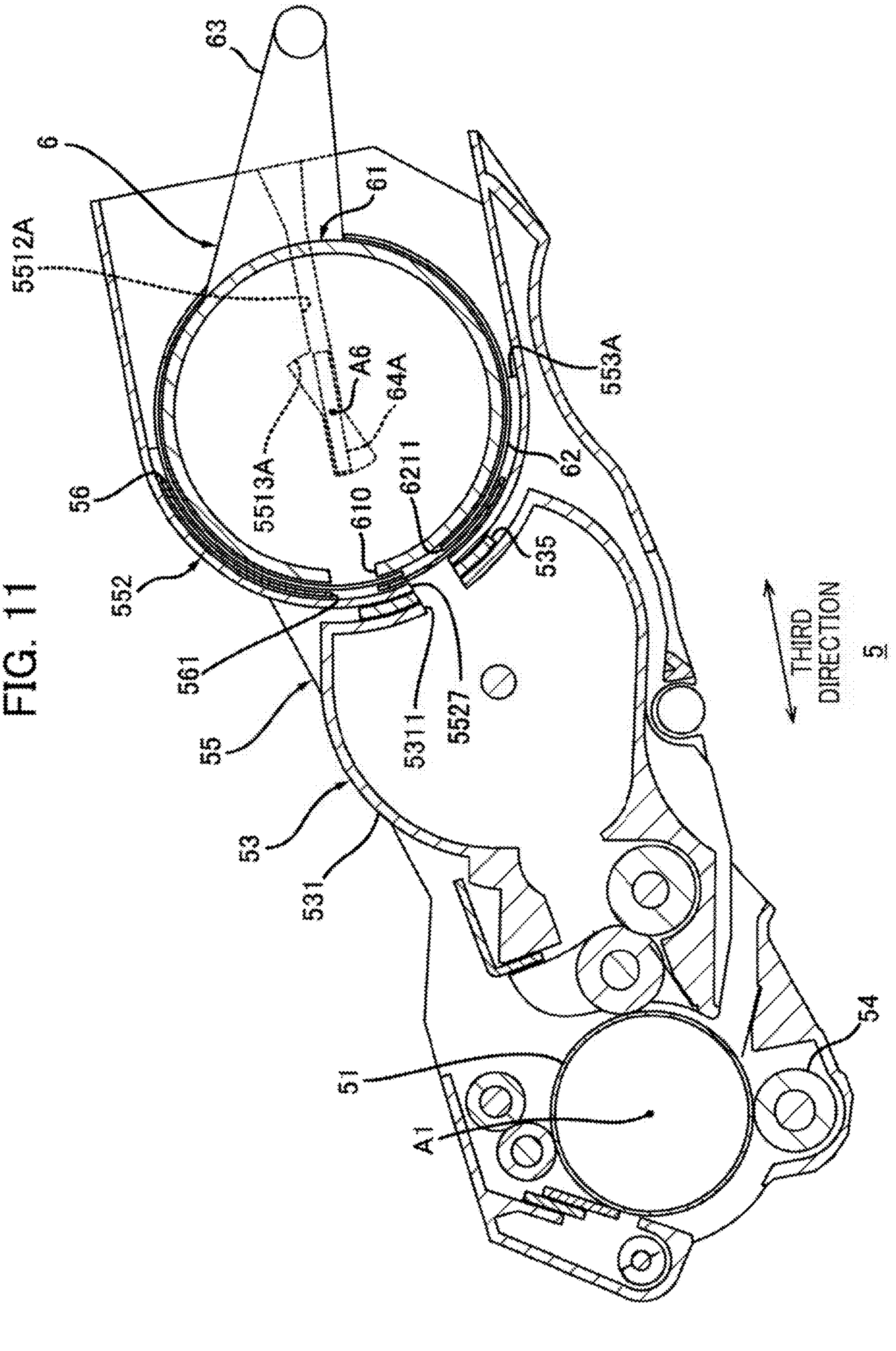
FIG. 11 is a cross-sectional view of the drum cartridge to which the toner cartridge illustrated in FIG. 8 is attached.
Figure 12:
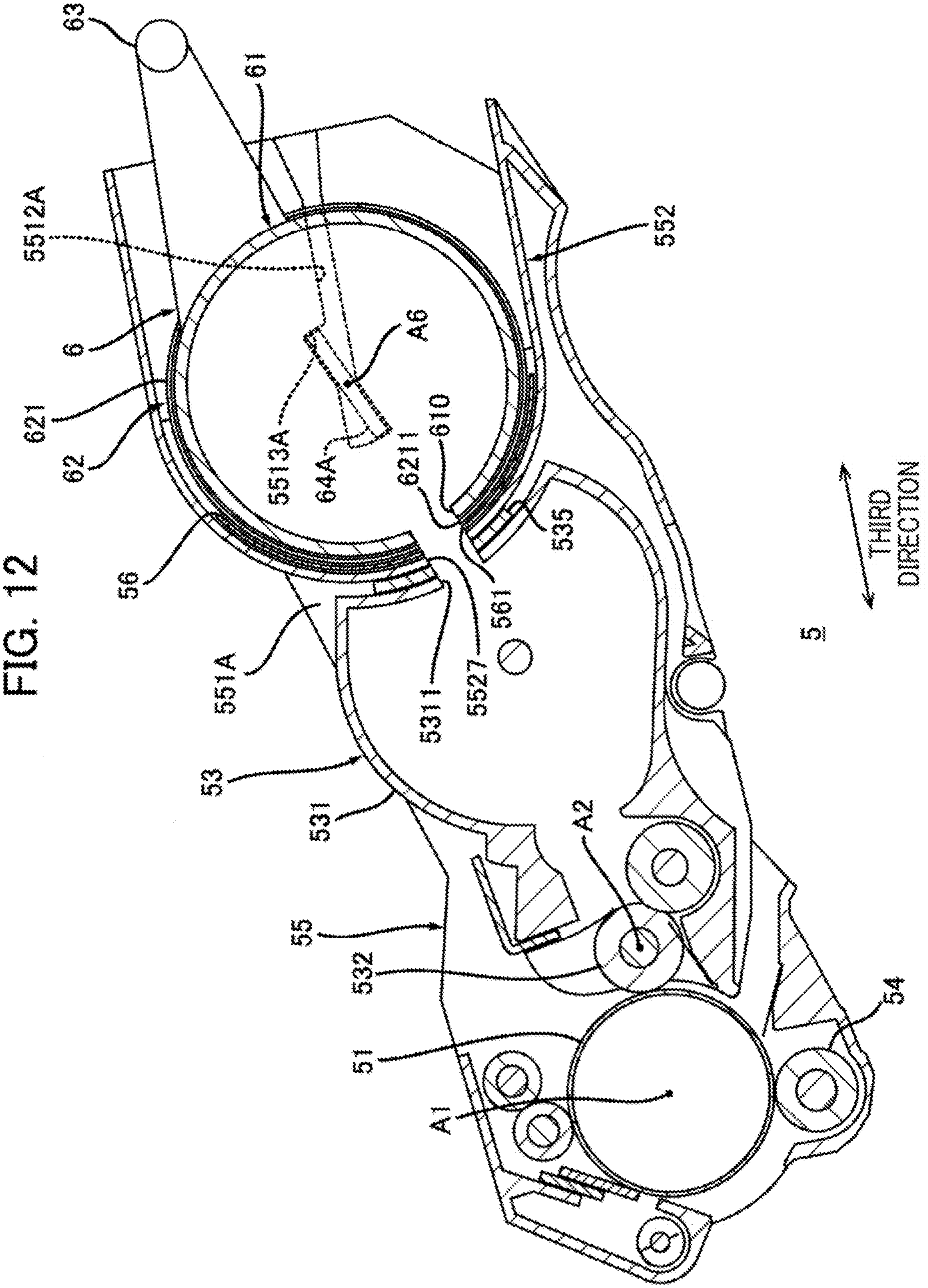
FIG. 12 is a cross-sectional view of the drum cartridge illustrated in FIG. 11, and particularly illustrating a state where a handle is in its first position.

The toner shutter 62 is configured to open and close the discharge opening 610. As illustrated in FIGS. 11 and 12, the toner shutter 62 is movable between a closed position (see FIG. 11) in which the toner shutter 62 closes the discharge opening 610, and an open position (see FIG. 12) in which the discharge opening 610 is opened. More specifically, the toner shutter 62 is pivotally movable about an axis A6 between the closed position (see FIG. 11) and the open position (see FIG. 12). As illustrated in FIG. 8, the axis A6 extends in the second direction. The toner shutter 62 includes a shutter body 621, and two protrusions 622A and 622B.

<3.4.1 Shutter Body 621>

The shutter body 621 is positioned at a center portion in the second direction of the toner cartridge 6. As illustrated in FIG. 10, the shutter body 621 is positioned on the peripheral surface S13 of the toner casing 61. In the present embodiment, the shutter body 621 has a hollow cylindrical shape. The shutter body 621 has a toner shutter opening 6211.

As illustrated in FIG. 9, the toner shutter opening 6211 is formed at a center portion in the second direction of the shutter body 621.

The toner shutter opening 6211 is positioned away from the discharge opening 610 in a state where the toner shutter 62 is in the closed position. Hence, the toner shutter opening 6211 is not in communication with the discharge opening 610. Consequently, the toner shutter 62 closes the discharge opening 610. As illustrated in FIG. 12, the toner shutter opening 6211 is in communication with the discharge opening 610 in a state where the toner shutter 62 is in the open position, thereby opening the discharge opening 610.

<3.4.2 Protrusions 622A and 622B>

As illustrated in FIG. 9, the protrusion 622A is positioned at one end portion in the second direction of the shutter body 621. The protrusion 622A is positioned between the toner shutter opening 6211 and the one side surface S11 of the toner casing 61 in the second direction. The protrusion 622A is positioned on the opposite side of the discharge opening 610 of the toner casing 61 from the protrusion 65B in the second direction. As illustrated in FIG. 10, the protrusion 622A is positioned on a peripheral surface of the shutter body 621. The protrusion 622A extends in a radial direction of the shutter body 621 (i.e., the radial direction of the toner casing 61).

As illustrated in FIG. 9, the protrusion 622B is positioned at another end portion in the second direction of the shutter body 621. The protrusion 622B is positioned between the toner shutter opening 6211 and the other side surface S12 of the toner casing 61 in the second direction. The protrusion 622B is positioned on the opposite side of the toner shutter opening 6211 from the protrusion 622A in the second direction. The protrusion 622B is positioned on the opposite side of the discharge opening 610 of the toner casing 61 from the protrusion 65A in the second direction. The protrusion 622B extends in the radial direction of the toner casing 61.

In a state where the toner shutter 62 is in the closed position, the protrusion 622A and the protrusion 65A face each other in the second direction, and the protrusion 622B and the protrusion 65B face each other in the second direction. On the other hand, in a state where the toner shutter 62 is in the open position, the protrusion 622A and the protrusion 65A do not face each other in the second direction, and the protrusion 622B and the protrusion 65B do not face each other in the second direction.

<3.5 Handle 63>

As illustrated in FIG. 8, the handle 63 is positioned at the center portion in the second direction of the toner cartridge 6. As illustrated in FIG. 10, the handle 63 is positioned on the peripheral surface S13 of the toner casing 61. In the present embodiment, the handle 63 extends from the peripheral surface S13 of the toner casing 61, and positioned on the opposite side of the axis A6 from the discharge opening 610 of the toner casing 61. The handle 63 extends in the radial direction of the toner casing 61.

<3.6 Attachment of Toner Cartridge 6 to Drum Cartridge 5>

As illustrated in FIG. 8, the toner shutter 62 is in the closed position in a state where the toner cartridge 6 is detached from the drum cartridge 5. As illustrated in FIG. 3, the developing shutter 56 is in the closed position in a state where the toner cartridge 6 is detached from the drum cartridge 5.

In order to attach the toner cartridge 6 to the drum cartridge 5, as illustrated in FIG. 11, a user inserts the toner cartridge 6 into the support portion 552 of the drum cartridge 5 such that the protrusions 64A and 64B (see FIG. 3) of the toner cartridge 6 are fitted in the guide portions 5512A and 5512B (see FIG. 3) of the drum cartridge 5, respectively.

At this time, the toner cartridge 6 is moved toward the developing unit 53 to a position in which the toner shutter 62 contacts the developing shutter 56.

When the toner shutter 62 contacts the developing shutter 56, the protrusion 622A (see FIG. 8) of the toner shutter 62 is fitted in the recessed portion 5525 (see FIG. 6) of the support portion 552 through the slit 562A (see FIG. 6) of the developing shutter 56. At the same time, the protrusion 622B (see FIG. 8) of the toner shutter 62 is fitted in the recessed portion 5526 (see FIG. 6) of the support portion 552 through the slit 562B (see FIG. 6) of the developing shutter 56. As a result, the toner shutter 62 is fixed to the support portion 552.

Also, when the toner shutter 62 contacts the developing shutter 56, the protrusion 65A (see FIG. 8) of the toner cartridge 6 is fitted in the engagement portion 563A (see FIG. 6) of the developing shutter 56 and the protrusion 65B (see FIG. 8) of the toner cartridge 6 is fitted in the engagement portion 563B (see FIG. 6) of the developing shutter 56. Thus, the developing shutter 56 is fixed to the toner casing 61.

In this state, the protrusion 64A of the toner cartridge 6 is positioned within the one end portion of the guide portion 5512A of the drum cartridge 5 as illustrated in FIG. 11, and the protrusion 64B (see FIG. 8) of the toner cartridge 6 is positioned within the one end portion of the guide portion 5512B (see FIG. 3) of the drum cartridge 5.

In the meantime, the handle 63 is pivotally movable between the first position (see FIG. 12) and the second position (see FIG. 11) as illustrate in FIGS. 11 and 12 in a state where the toner cartridge 6 is attached to the drum cartridge 5. In other words, a part of the toner cartridge 6 is pivotally movable between the first position (see FIG. 12) and the second position (see FIG. 11) in a state where the toner cartridge 6 is attached to the drum cartridge 5.

In the present embodiment, the toner casing 61 of the toner cartridge 6 is pivotally movable relative to the support portion 552 of the drum cartridge 5 in accordance with pivotal movement of the handle 63 between the first position (see FIG. 12) and the second position (see FIG. 11).

As illustrated in FIG. 11, the developing shutter 56 is in the closed position and the toner shutter 62 is in the closed position in a state where the toner cartridge 6 is attached to the drum cartridge 5 and the handle 63 is in the second position.

As the user moves the handle 63 from the second position to the first position as illustrated in FIG. 12, the toner casing 61 is pivotally moved to move the developing shutter 56 from the closed position toward the open position together with pivotal movement of the toner casing 61.

At this time, the toner casing 61 is pivotally moved relative to the toner shutter 62 that is fixed to the support portion 552. In other words, the toner shutter 62 is moved from the closed position to the open position relative to the toner casing 61.

Also, as a result of the pivotal movement of the toner casing 61, the protrusion 64A is fitted in the locking portion 5513A and the protrusion 64B (see FIG. 8) is fitted in the locking portion 5513B (see FIG. 3). Thus, the toner cartridge 6 is fixed to the drum cartridge 5. In other words, the toner cartridge 6 is fixed to the drum cartridge 5 in a state where the toner cartridge 6 is attached to the drum cartridge 5 and the part of the toner cartridge 6 is in the first position.

The developing shutter 56 is in the open position and the toner shutter 62 is in open position in a state where the toner cartridge 6 is attached to the drum cartridge 5 and the handle 63 is in the first position.

As illustrated in FIGS. 11 and 12, as the user moves the handle 63 from the first position (see FIG. 12) to the second position (see FIG. 11), the developing shutter 56 is moved from the open position to the closed position, and the toner shutter 62 is moved from the open position to the closed position relative to the toner casing 61. Further, the protrusion 64A is disengaged from the locking portion 5513A and the protrusion 64B (see FIG. 8) is disengaged from the locking portion 5513B (see FIG. 3). Thus, the toner cartridge 6 becomes unlocked from the drum cartridge 5 (i.e., the toner cartridge 6 is no longer fixed to the drum cartridge 5). In other words, the toner cartridge 6 is not locked relative to the drum cartridge 5 in a state where the toner cartridge 6 is attached to the drum cartridge 5 and the part of the toner cartridge 6 is in the second position.

<4. Details of Image Forming Apparatus 1>

The image forming apparatus 1 will be described in detail with reference to FIGS. 1, 2, and FIGS. 13 through 16.

Figure 13:
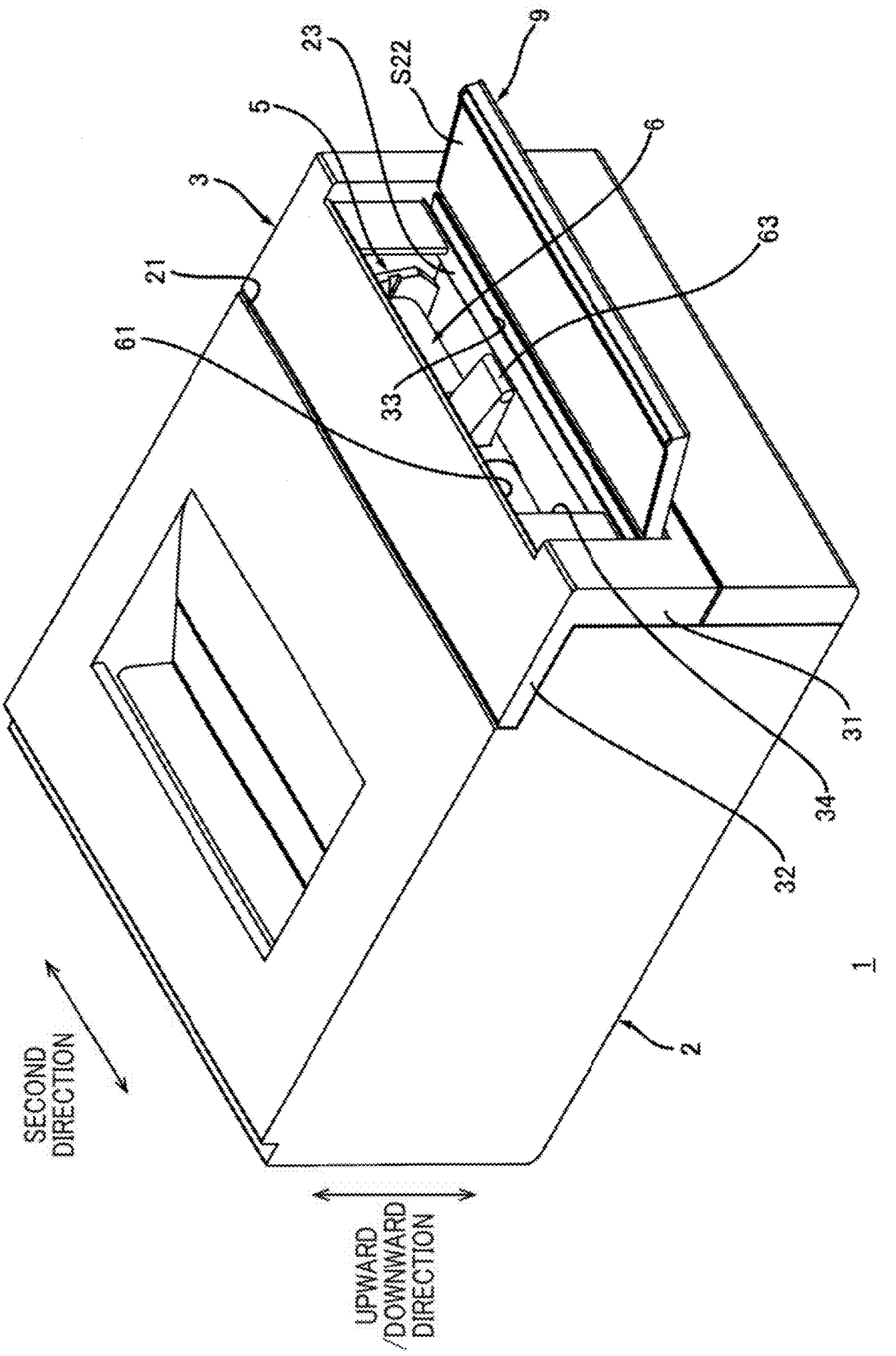
FIG. 13 is a perspective view of the image forming apparatus illustrated in FIG. 1, and particularly illustrating a state where a second cover is in its second open position.

As illustrated in FIG. 13, the image forming apparatus 1 further includes a second cover 9 in addition to the main casing 2 and the first cover 3 described above.

<4.1 Main Casing 2>

As illustrated in FIG. 2, the main casing 2 includes guide portions 221A, 221B, 222A, and 222B, abutment portions 224A and 224B, and a partition 23, in addition to the first opening 21 described above. Note that, although not illustrated in the drawings in detail, the guide portions 221B and 222B, and the abutment portion 224B have configurations the same as those of the guide portions 221A and 222A, and the abutment portion 224A, respectively.

<4.1.1 Guide Portions 221A, 221B, 222A, and 222B>

The guide portion 221A extends in the first direction. In the present embodiment, the guide portion 221A is a groove. During attachment and detachment of the drum cartridge 5 relative to the main casing 2, the guide portion 221A guides the protrusion 57A of the drum cartridge 5.

The guide portion 221B extends in the first direction. In the present embodiment, the guide portion 221B is a groove. During the attachment and the detachment of the drum cartridge 5 relative to the main casing 2, the guide portion 221B guides the protrusion 57B (see FIG. 4) of the drum cartridge 5.

The guide portion 222A is positioned away from the guide portion 221A. The guide portion 222A extends in the first direction. In the present embodiment, the guide portion 222A is a groove. During the attachment and the detachment of the drum cartridge 5 relative to the main casing 2, the guide portion 222A guides the protrusion 58A of the drum cartridge 5.

The guide portion 222B is positioned away from the guide portion 221B. The guide portion 222B extends in the first direction. In the present embodiment, the guide portion 222B is a groove. During the attachment and the detachment of the drum cartridge 5 relative to the main casing 2, the guide portion 222B guides the protrusion 58B (see FIG. 4) of the drum cartridge 5.

<4.1.2 Abutment Portions 224A and 224B>

The abutment portion 224A is positioned at one end portion in the first direction of the guide portion 222A. The abutment portion 224A extends in a direction crossing the first direction. In the present embodiment, the abutment portion 224A extends in an upward/downward direction. The protrusion 58A of the drum cartridge 5 is fitted in the abutment portion 224A in a state where the drum cartridge 5 is attached to the main casing 2.

The abutment portion 224B is positioned at one end portion in the first direction of the guide portion 222B. The abutment portion 224B extends in a direction crossing the first direction. In the present embodiment, the abutment portion 224B extends in the upward/downward direction. The protrusion 58B (see FIG. 4) of the drum cartridge 5 is fitted in the abutment portion 224B in a state where the drum cartridge 5 is attached to the main casing 2.

Figure 14:
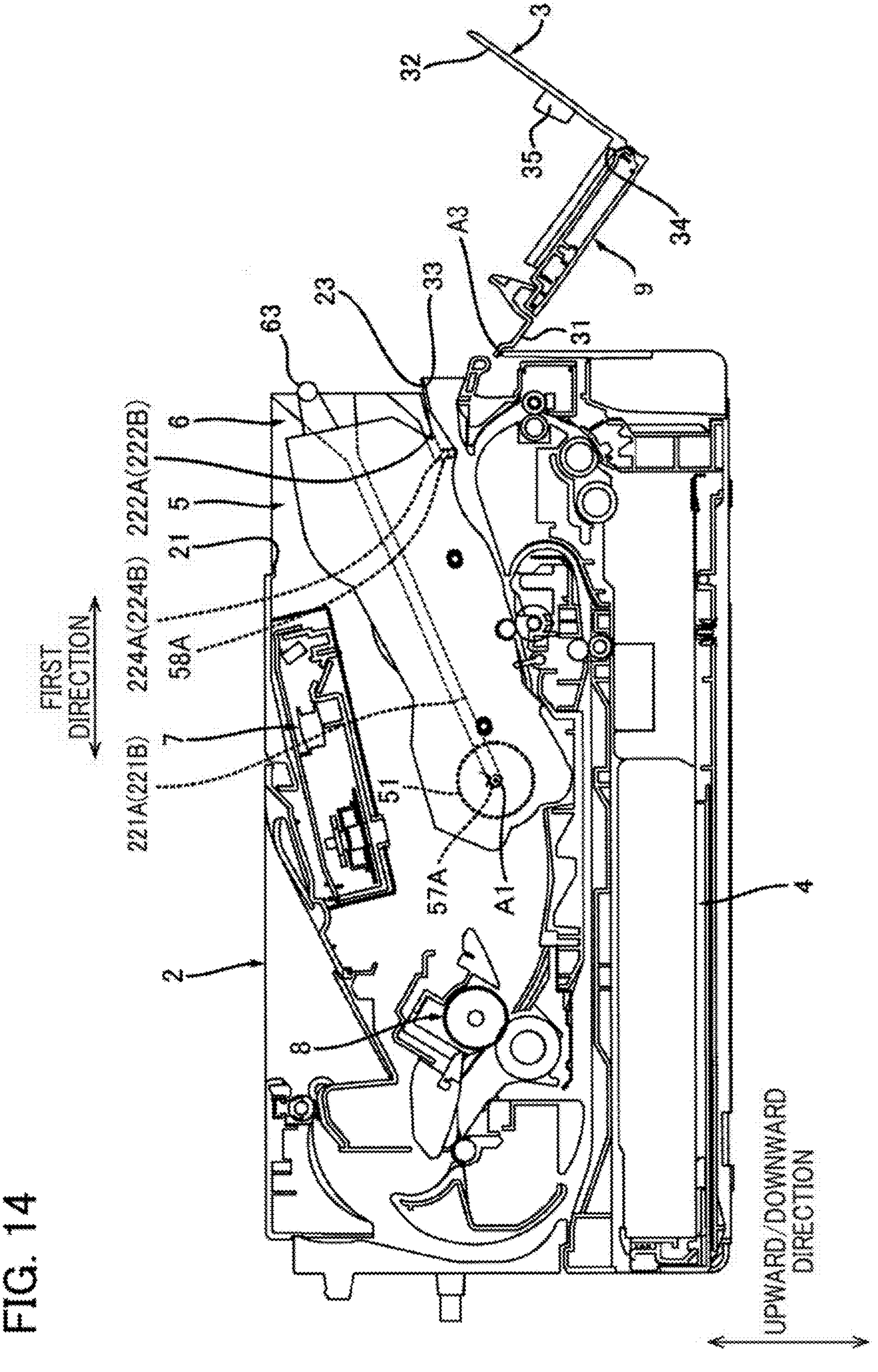
FIG. 14 is a cross-sectional view of the image forming apparatus illustrated in FIG. 13, and particularly illustrating a state where a first cover is in its first open position.

As illustrated in FIG. 14, upon fitting engagement of the protrusions 58A and 58B (see FIG. 4) with the abutment portions 224A and 224B, respectively, the drum cartridge 5 is locked relative to the main casing 2 in the first direction, whereby the drum cartridge 5 is positioned in its drum locking position. In other words, the drum cartridge 5 is locked relative to the main casing 2 in a state where the drum cartridge 5 is accommodated in the main casing 2 and the drum cartridge 5 is in the drum locking position. Note that "the drum cartridge 5 is locked relative to the main casing 2" indicates that the drum cartridge 5 is fixed to the main casing 2 in the first direction so as not to be detachable (i.e., movable in the first direction) from the main casing 2.

Figure 15:
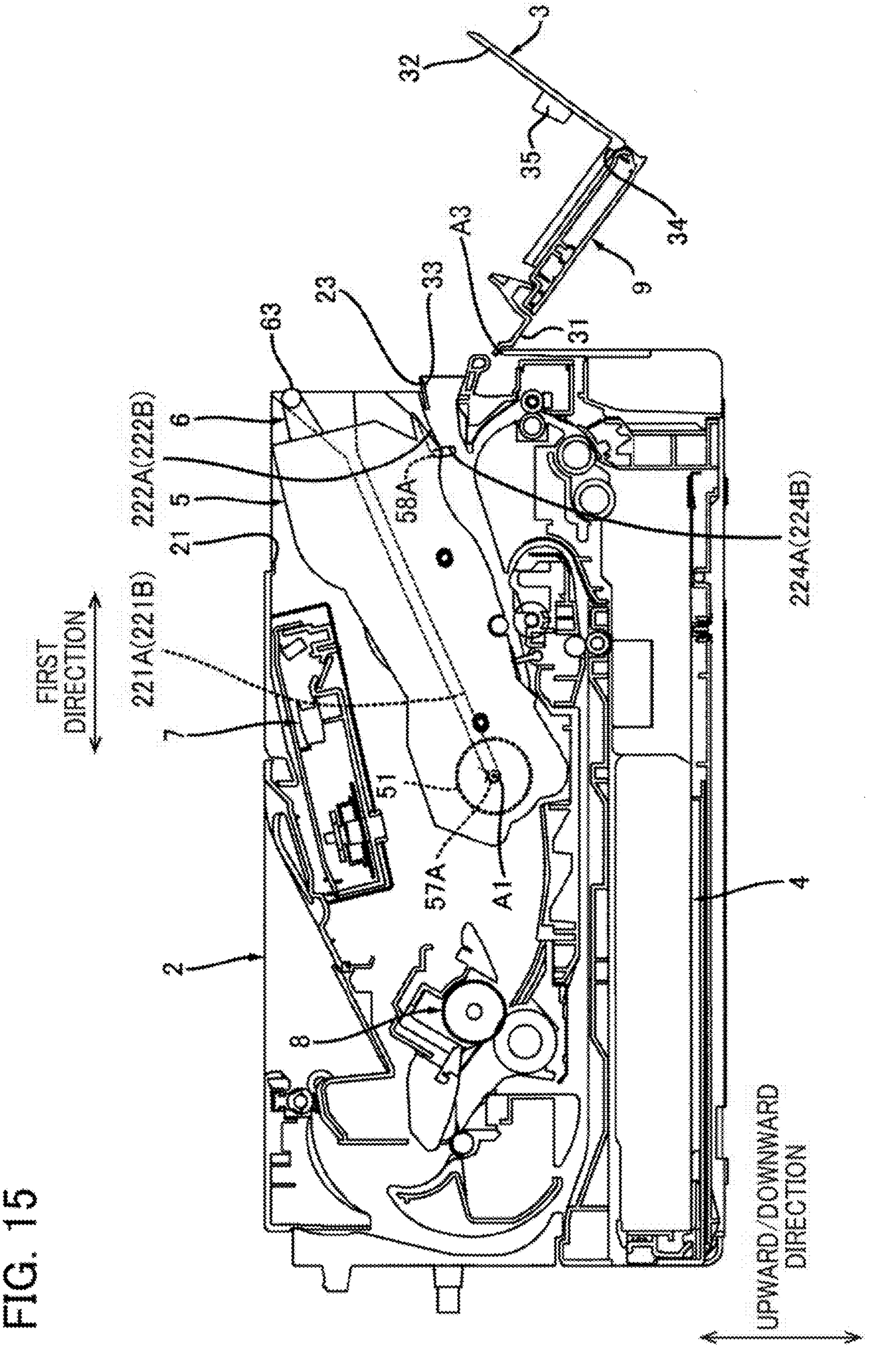
FIG. 15 is a cross-sectional view of the image forming apparatus illustrated in FIG. 13, and particularly illustrating a state where the drum cartridge is in its drum unlocking position.

As illustrated in FIGS. 14 and 15, the drum cartridge 5 is movable between the drum locking position (see FIG. 14) and a drum unlocking position (see FIG. 15). More specifically, the drum cartridge 5 is pivotally movable between the drum locking position and the drum unlocking position about the drum axis A1 in a state where the drum cartridge 5 is accommodated in the main casing 2.

As illustrated in FIG. 14, the protrusion 58A of the drum cartridge 5 contacts the abutment portion 224A of the main casing 2 and the protrusion 58B (see FIG. 4) of the drum cartridge 5 contacts the abutment portion 224B of the main casing 2 when the user pulls the drum cartridge 5 in the first direction in a state where the drum cartridge 5 is in the drum locking position. In other words, the abutment portion 224A of the main casing 2 contacts the protrusion 58A constituting a part of the drum cartridge 5, and the abutment portion 224B of the main casing 2 contacts the protrusion 58B (see FIG. 4) also constituting another part of the drum cartridge 5 in a state where the drum cartridge 5 in the drum locking position is moved in the first direction. Thus, the user cannot pull out the drum cartridge 5 in the first direction in a state where the drum cartridge 5 is attached to the main casing 2 and the drum cartridge 5 is in the drum locking position, thereby preventing detachment of the drum cartridge 5 from the main casing 2 in the first direction.

As the drum cartridge 5 is moved from the drum locking position (see FIG. 14) to the drum unlocking position (see FIG. 15) in a state where the first cover 3 is in the first open position, the protrusion 58A becomes disengaged from the abutment portion 224A and the protrusion 58B (see FIG. 4) also becomes disengaged from the abutment portion 224B. Through this movement, the drum cartridge 5 is unlocked relative to the main casing 2 (i.e., the drum cartridge 5 is no longer fixed to the main casing 2). In other words, the drum cartridge 5 is not locked relative to the main casing 2 in a state where the drum cartridge 5 is accommodated in the main casing 2 and the drum cartridge 5 is in the drum unlocking position.

The drum cartridge 5 is detachable from the main casing 2 in the first direction in a state where the first cover 3 is in the first open position and the drum cartridge 5 is in the drum unlocking position.

In order to detach the drum cartridge 5 from the main casing 2, first the user moves the first cover 3 to the first open position as illustrated in FIG. 14.

Next, the user moves the drum cartridge 5 from the drum locking position to the drum unlocking position as illustrated in FIGS. 14 and 15.

At this time, a direction in which the drum cartridge 5 is moved from the drum locking position toward the drum unlocking position is opposite to a direction in which the handle 63 (i.e., the part of the toner cartridge 6) is moved from the first position toward the second position. With the above configuration, the handle 63 can be maintained at the first position when the drum cartridge 5 is moved from the drum locking position to the drum unlocking position, and therefore, the toner cartridge 6 is still locked relative to (fixed to) the drum cartridge 5.

Next, as illustrated in FIG. 15, the user pulls out the drum cartridge 5 in the first direction in a state where the drum cartridge 5 is in the drum unlocking position.

As a result, the drum cartridge 5 is detached from the main casing 2 by the user through the first opening 21 while passing above the partition 23.

<4.1.3 Partition 23>

Figure 16:
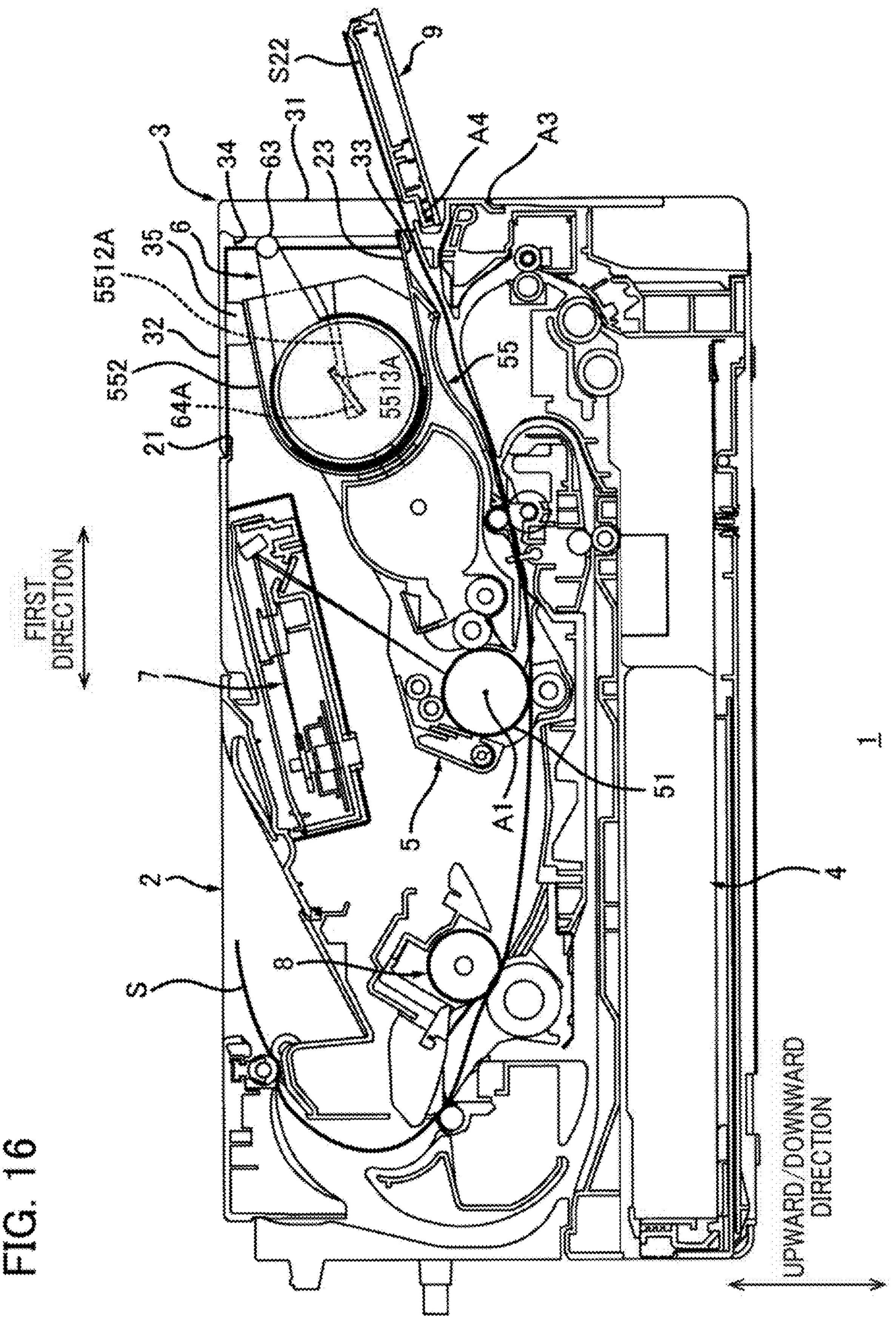
FIG. 16 is a cross-sectional view of the image forming apparatus illustrated in FIG. 13, and particularly illustrating a state where the second cover is in the second open position.

As illustrated in FIG. 13, the partition 23 is positioned in the first opening 21. As illustrated in FIGS. 13 and 16, the partition 23 separates a second opening 34 and a sheet opening 33 from each other in a state where the first cover 3 is in the first closed position. The second opening 34 and the sheet opening 33 will be described later. The partition 23 extends in the second direction. As illustrated in FIG. 16, the partition 23 is positioned on the opposite side of the drum cartridge 5 from the fixing unit 8 in the first direction in a state where the drum cartridge 5 is attached to the main casing 2 and the drum cartridge 5 is in the drum locking position. The partition 23 is continuous with a lower end portion of the drum frame 55 in a state where the drum cartridge 5 is attached to the main casing 2.

<4.2 First Cover 3>

As illustrated in FIG. 13, the first cover 3 is positioned at one end portion in the first direction of the main casing 2. The first cover 3 includes a first plate 31, a second plate 32, and a stopper 35 (see FIG. 16), and has the sheet opening 33, and the second opening 34.

<4.2.1 First Plate 31>

As illustrated in FIG. 16, the first plate 31 extends in the upward/downward direction in a state where the first cover 3 is in the first closed position. Also, the first axis A3 is positioned at a lower end portion of the first plate 31 in a state where the first cover 3 is in the first closed position. In other words, the first axis A3 is positioned at a lower end portion of the first cover 3 in a state where the first cover 3 is in the first closed position. The first axis A3 is positioned further downward relative to the partition 23. The first axis A3 is positioned further upward relative to the sheet accommodating portion 4.

<4.2.2 Second Plate 32>

The second plate 32 is positioned above the support portion 552 of the drum cartridge 5 in a state where the drum cartridge 5 is attached to the main casing 2, the drum cartridge 5 is in the drum locking position, and the first cover 3 is in the first closed position. The second plate 32 extends in the first direction in a state where the drum cartridge 5 is attached to the main casing 2, the drum cartridge 5 is in the drum locking position, and the first cover 3 is in the first closed position.

<4.2.3 Sheet Opening 33>

The user can insert a sheet S that is different from the sheet S accommodated in the sheet accommodating portion 4 into the main casing 2 through the sheet opening 33 in a state where the first cover 3 is in the first closed position and the second cover 9 is in the second open position. The sheet opening 33 is positioned between the second opening 34 and the sheet accommodating portion 4 in a state where the first cover 3 is in the first closed position. The sheet opening 33 is positioned on the opposite side of the partition 23 from the second opening 34 in the upward/downward direction.

<4.2.4 Second Opening 34>

In the present embodiment, the second opening 34 is provided at a center portion in the second direction of the first plate 31 as illustrated in FIG. 13. The second opening 34 is smaller than the first opening 21.

Also, the second opening 34 is smaller than the drum cartridge 5. The second opening 34 has a dimension in the second direction smaller than a dimension in the second direction of the drum cartridge 5. With this configuration, the drum cartridge 5 is in capable of passing through the second opening 34.

The second opening 34 is larger than the toner cartridge 6. Accordingly, the toner cartridge 6 is capable of passing through the second opening 34. In other words, the first opening 21 has a size that allows the toner cartridge 6 to pass therethrough, but does not allow the drum cartridge 5 to pass therethrough.

<4.2.5 Stopper 35>

As illustrated in FIG. 16, the stopper 35 is positioned above the support portion 552 in a state where the drum cartridge 5 is attached to the main casing 2, the drum cartridge 5 is in the drum locking position, and the first cover 3 is in the first closed position. The stopper 35 faces the support portion 552 in the upward/downward direction in a state where the drum cartridge 5 is attached to the main casing 2, the drum cartridge 5 is in the drum locking position, and the first cover 3 is in the first closed position. The stopper 35 protrudes from the second plate 32 toward the support portion 552 of the drum cartridge 5 in a state where the drum cartridge 5 is attached to the main casing 2, the drum cartridge 5 is in the drum locking position, and the first cover 3 is in the first closed position.

<4.2.6 Second Cover 9>

The second cover 9 is attached to the first cover 3. As illustrated in FIGS. 1 and 16, the second cover 9 is movable between a second closed position (see FIG. 1) and a second open position (see FIGS. 13 and 16). As illustrated in FIG. 1, the second cover 9 closes the second opening 34 in a state where the second cover 9 is in the second closed position. In other words, the second cover 9 closes a part of the first opening 21 in a state where the second cover 9 is in the second closed position. As illustrated in FIG. 16, the second opening 34 is opened in a state where the second cover 9 is in the second open position. In other words, the part of the first opening 21 is opened in a state where the second cover 9 is in the second open position.

As illustrated in FIGS. 1 and 16, the second cover 9 is pivotally movable between the second closed position (see FIG. 1) and the second open position (see FIG. 16) about a second axis A4. As illustrated in FIG. 1, the second axis A4 is positioned at a lower end portion of the second cover 9 in a state where the second cover 9 is in the second closed position. The second axis A4 is positioned further downward relative to the partition 23. The second axis A4 is positioned above the first axis A3 in a state where the first cover 3 is in the first closed position. The second axis A4 is positioned below the sheet opening 33. The second axis A4 extends in a direction coincident with a direction in which the first axis A3 extends.

As illustrated in FIG. 1, the second cover 9 extends in the upward/downward direction in a state where the first cover 3 is in the first closed position and the second cover 9 is in the second closed position.

The second cover 9 includes a sheet support portion S22. The sheet support portion S22 serves as an upper surface of the second cover 9 in a state where the first cover 3 is in the first closed position and the second cover 9 is in the second open position. Both the second opening 34 and the sheet opening 33 are opened in a state where the first cover 3 is in the first closed position and the second cover 9 is in the second open position. At this time, the sheet support portion S22 is exposed to an outside.

The second cover 9 is positioned on the opposite side of the partition 23 from the drum cartridge 5 in the first direction in a state where the drum cartridge 5 is attached to the main casing 2, the drum cartridge 5 is in the drum locking position, and the second cover 9 is in the second open position. The second cover 9 extends in the first direction in a state where the second cover 9 is in the second open position. With this configuration, the sheet support portion S22 of the second cover 9 supports the sheet S inserted through the sheet opening 33 in a state where the first cover 3 is in the first closed position and the second cover 9 is in the second open position.

As illustrated in FIG. 1, the second cover 9 closes both the second opening 34 and the sheet opening 33 in a state where the second cover 9 is in the second closed position.

<5. Attachment and Detachment of Toner Cartridge 6 relative to Drum Cartridge 5>

<5.1 Detachment of Toner Cartridge 6>

Next, the attachment and the detachment of the toner cartridge 6 to and from the drum cartridge 5 will be described while referring to FIGS. 1, 16, and 17.

As illustrated in FIGS. 1 and 16, the user moves the second cover 9 to the second open position in a state where the drum cartridge 5 is attached to the main casing 2, the toner cartridge 6 is attached to the drum cartridge 5, and the first cover 3 is in the first closed position. Thus, the second opening 34 is opened.

Figure 17:
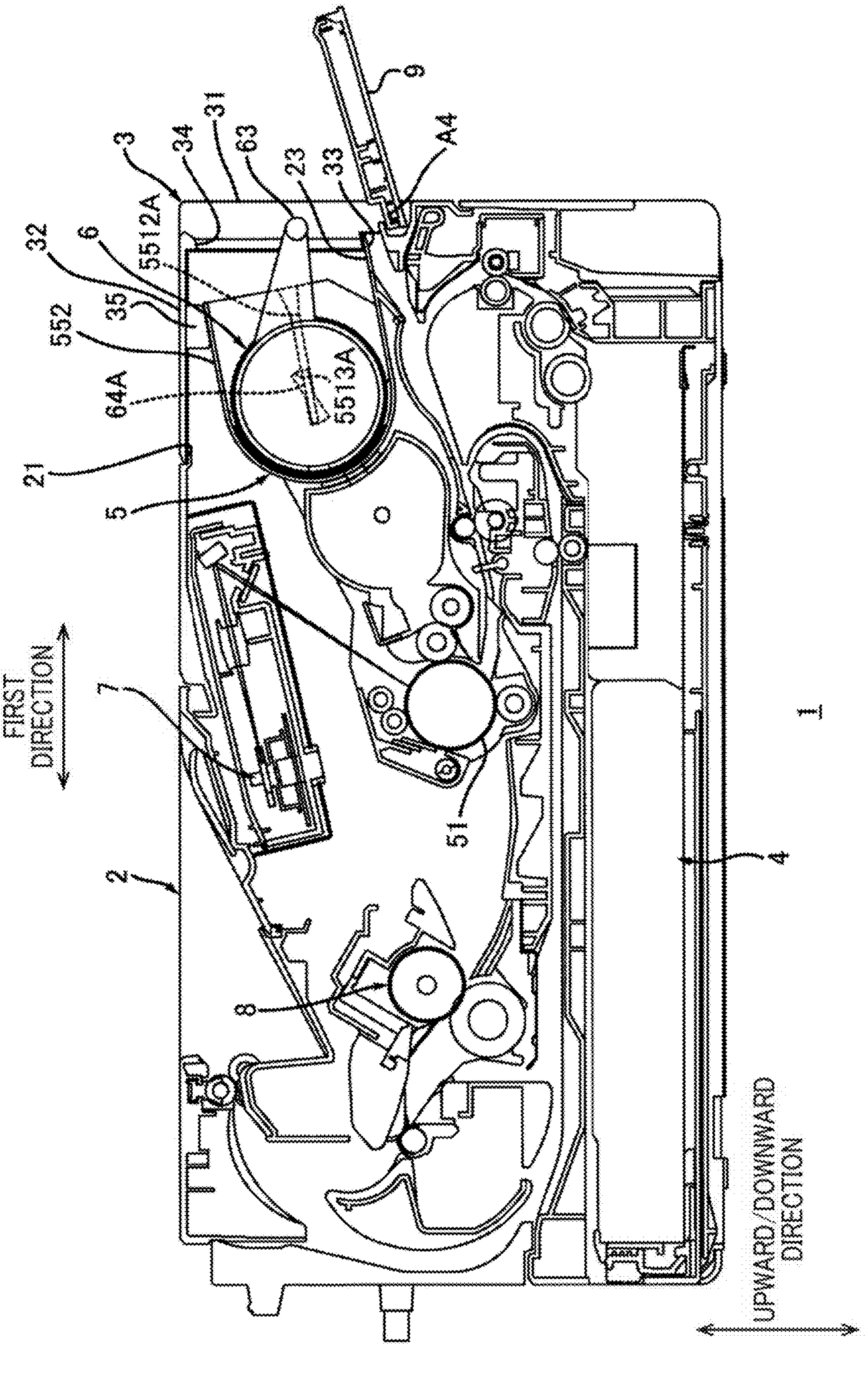
FIG. 17 is a cross-sectional view of the image forming apparatus illustrated in FIG. 13, and particularly illustrating a state where the handle is in its second position.

As illustrated in FIGS. 16 and 17, the user moves the handle 63 from the first position to the second position, whereby the developing shutter 56 of the drum cartridge 5 is in the closed position and the toner shutter 62 of the toner cartridge 6 is in the closed position as described above. That is, as illustrated in FIG. 11, the developing shutter 56 closes the inlet opening 5311 and the toner shutter 62 closes the discharge opening 610 in a state where the toner cartridge 6 is attached to the drum cartridge 5 and the part of the toner cartridge 6 is in the second position.

Next, as illustrated in FIG. 17, the user grasps the handle 63 while the handle 63 is in the second position to pull out the toner cartridge 6 in the first direction.

At this time, the abutment portions 224A (see FIG. 14) and 224B of the main casing 2 abut against the protrusions 58A (see FIG. 14) and 58B (see FIG. 4) of the drum cartridge 5, respectively. As a result, the detachment of the drum cartridge 5 from the main casing 2 in the first direction is restrained. Accordingly, the toner cartridge 6 is detachable from the drum cartridge 5 through the second opening 34 while the drum cartridge 5 remains attached to the main casing 2.

<5.2 Attachment of Toner Cartridge 6>

In order to attach the toner cartridge 6 to the drum cartridge 5, the user inserts the toner cartridge 6 into the support portion 552 of the drum cartridge 5 through the second opening 34 in a state where the drum cartridge 5 is attached to the main casing 2, the first cover 3 is in the first closed position, and the second cover 9 is in the second open position. Through this operation, the toner cartridge 6 is attached to the support portion 552 of the drum cartridge 5.

At this time, the handle 63 of the toner cartridge 6 is in the second position. The handle 63 protrudes outward from the second opening 34 in a state where the handle 63 is in the second position. That is, the part of the toner cartridge 6 protrudes outward from the second opening 34 in a state where the drum cartridge 5 is attached to the main casing 2, the toner cartridge 6 is attached to the drum cartridge 5, the handle 63 is in the second position, and the first cover 3 is in the first closed position.

The second cover 9 cannot be positioned in the second closed position due to interference between the second cover 9 and the handle 63 that serves as the part of the toner cartridge 6 in a state where the drum cartridge 5 is attached to the main casing 2, the toner cartridge 6 is attached to the drum cartridge 5, the handle 63 is in the second position, and the first cover 3 is in the first closed position. Hence, this configuration prompts the user to move the handle 63 from the second position to the first position when the user intends to close the second opening 34 using the second cover 9.

As illustrated in FIG. 16, as a result of the movement of the handle 63 by the user from the second position to the first position, the handle 63 is in the first position, the inlet opening 5311 (see FIG. 12) of the developing unit 53 is opened, and the discharge opening 610 (see FIG. 12) of the toner cartridge 6 is also opened as described above. In other words, both the inlet opening 5311 and the discharge opening 610 are opened in a state where the toner cartridge 6 is attached to the drum cartridge 5 and the handle 63 is in the first position. Thus, this configuration can avoid a situation in which the user closes the second opening 34 without opening the inlet opening 5311 and the discharge opening 610.

As illustrated in FIG. 1, the handle 63 does not protrude outward from the second opening 34 in a state where the drum cartridge 5 is attached to the main casing 2, the toner cartridge 6 is attached to the drum cartridge 5, the handle 63 is in the first position, and the first cover 3 is in the first closed position. Accordingly, the second cover 9 can be positioned in the second closed position in a state where the drum cartridge 5 is attached to the main casing 2, the toner cartridge 6 is attached to the drum cartridge 5, the handle 63 is in the first position, and the first cover 3 is in the first closed position.

As illustrated in FIG. 16, the stopper 35 does not allow the drum cartridge 5 to be moved from the drum locking position to the drum unlocking position in spite of the movement of the handle 63 by the user from the second position to the first position in a state where the drum cartridge 5 is attached to the main casing 2, the first cover 3 is in the first closed position, and the second cover 9 is in the second open position. In other words, the stopper 35 does not allow the drum cartridge 5 to be moved from the drum locking position to the drum unlocking position in a state where the drum cartridge 5 is attached to the main casing 2, the first cover 3 is in the first closed position, and the second cover 9 is in the second open position. Thus, the drum cartridge 5 can be maintained at the drum locking position with the state where the first cover 3 is in the first closed position.

<6. Operations and Advantages of Embodiment>

(1) According to the image forming apparatus 1, the second opening 34 is smaller than the first opening 21, and therefore the drum cartridge 5 cannot pass through the second opening 34.

Accordingly, the user can detach the toner cartridge 6 from the main casing 2 through the second opening 34 but cannot detach the drum cartridge 5 from the main casing 2 through the second opening 34 in a state where the drum cartridge 5 is attached to the main casing 2, the toner cartridge 6 is attached to the drum cartridge 5, and the first cover 3 is in the first closed position.

As a result, the user can pull out the toner cartridge 6 without accidental detachment of the drum cartridge 5.

(2) According to the image forming apparatus 1, the sheet opening 33 can be closed by making use of the second cover 9 as illustrated in FIG. 1 without providing an additional member for closing the sheet opening 33.

(3) According to the image forming apparatus 1, the second cover 9 can be used to support the sheet S inserted through the sheet opening 33 as illustrated in FIG. 16.

(4) According to the image forming apparatus 1, the second opening 34 and the sheet opening 33 can be clearly distinguished from each other.

As a result, the user can insert the sheet S into the main casing 2 through the sheet opening 33 while avoiding insertion of the sheet S into the second opening 34 by mistake.

(5) According to the image forming apparatus 1, the drum cartridge 5 can be positioned in the drum locking position in a state where the first cover 3 is in the first closed position.

Accordingly, the user's operation for detaching the toner cartridge 6 from the drum cartridge 5 does not lead to the movement of the drum cartridge 5 relative to the main casing 2 in a case where the toner cartridge 6 is detached from the drum cartridge 5 in a state where the first cover 3 is in the first closed position.

(6) According to the image forming apparatus 1, the detachment of the drum cartridge 5 from the main casing 2 in the first direction is restrained in a state where the drum cartridge 5 is attached to the main casing 2 and the drum cartridge 5 is in the drum locking position.

(7) According to the image forming apparatus 1, the second cover 9 is incapable of being positioned in the second closed position due to the interference of the second cover 9 with the handle 63 as illustrated in FIG. 17 in a state where the drum cartridge 5 is attached to the main casing 2, the toner cartridge 6 is attached to the drum cartridge 5, the part of the toner cartridge 6 (i.e., the handle 63) is in the second position, and the first cover 3 is in the first closed position. This configuration prompts the user to move the handle 63 from the second position to the first position when the user closes the second opening 34 using the second cover 9.

(8) According to the image forming apparatus 1, when the user intends to close the second opening 34 as illustrated in FIG. 1, the toner cartridge 6 can be locked relative to the drum cartridge 5 in accordance with the user's operation to move the handle 63 from the second position to the first position. Thus, the second opening 34 can be closed after the toner cartridge 6 is locked relative to the drum cartridge 5.

(9) According to the image forming apparatus 1, when closing movement of the second opening 34 by the second cover 9 is desired by the user, both the inlet opening 5311 and the discharge opening 610 are opened by the user's operation to move the part of the toner cartridge 6 from the second position to the first position as illustrated in FIG. 12. This configuration can avoid the user from closing the second opening 34 without opening the inlet opening 5311 and the discharge opening 610.

On the other hand, the developing shutter 56 closes the inlet opening 5311 and the toner shutter 62 closes the discharge opening 610 in accordance with the user's operation to move the part of the toner cartridge 6 from the first position to the second position as illustrated in FIG. 11, when the user opens the second opening 34. Hence, leakage of the toner out of the toner casing 61 through the discharge opening 610 can be restrained when the toner cartridge 6 is detached from the drum cartridge 5 in a state where the drum cartridge 5 is attached to the main casing 2.

(10) According to the image forming apparatus 1, the drum cartridge 5 does not become unlocked following the user's operation to move the part of the toner cartridge 6 from the second position to the first position is restrained as illustrated in FIG. 14 in a state where the drum cartridge 5 is accommodated in the main casing 2 and the first cover 3 is in the first closed position.

(11) According to the image forming apparatus 1, the movement of the drum cartridge 5 from the drum locking position to the drum unlocking position in accordance with the movement of the part of the toner cartridge 6 from the first position to the second direction can be restrained as illustrated in FIG. 17.

Therefore, the toner cartridge 6 can be unlocked relative to the drum cartridge 5 while locking of the drum cartridge 5 to the main casing 2 is maintained.

As a result, the toner cartridge 6 can be pulled out from the drum cartridge 5 and from the main casing 2 while the drum cartridge 5 is locked to the main casing 2.

(12) According to the image forming apparatus 1, the second opening 34 constituting the part of the first opening 21 has a size such that the second opening 34 (the part of the first opening 21) allows the toner cartridge 6 to pass therethrough but does not allow the drum cartridge 5 to pass therethrough.

With this configuration, the user can pull out the toner cartridge 6 through the part of the first opening 21 but cannot pull out the drum cartridge 5 through the part of the first opening 21 when the user intends to detach the toner cartridge 6 in a state where the drum cartridge 5 is attached to the main casing 2, the toner cartridge 6 is attached to the drum cartridge 5, and the first cover 3 is in the first closed position.

As a result, the user can pull out the toner cartridge 6 while restraining unintentional detachment of the drum cartridge 5.

<7. Modifications>

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

Hereinafter, two modifications will be described with reference to FIGS. 18 and 19, wherein like parts and components are designated by the same reference numerals as those in the above embodiment to avoid duplicating description.

Figure 18:
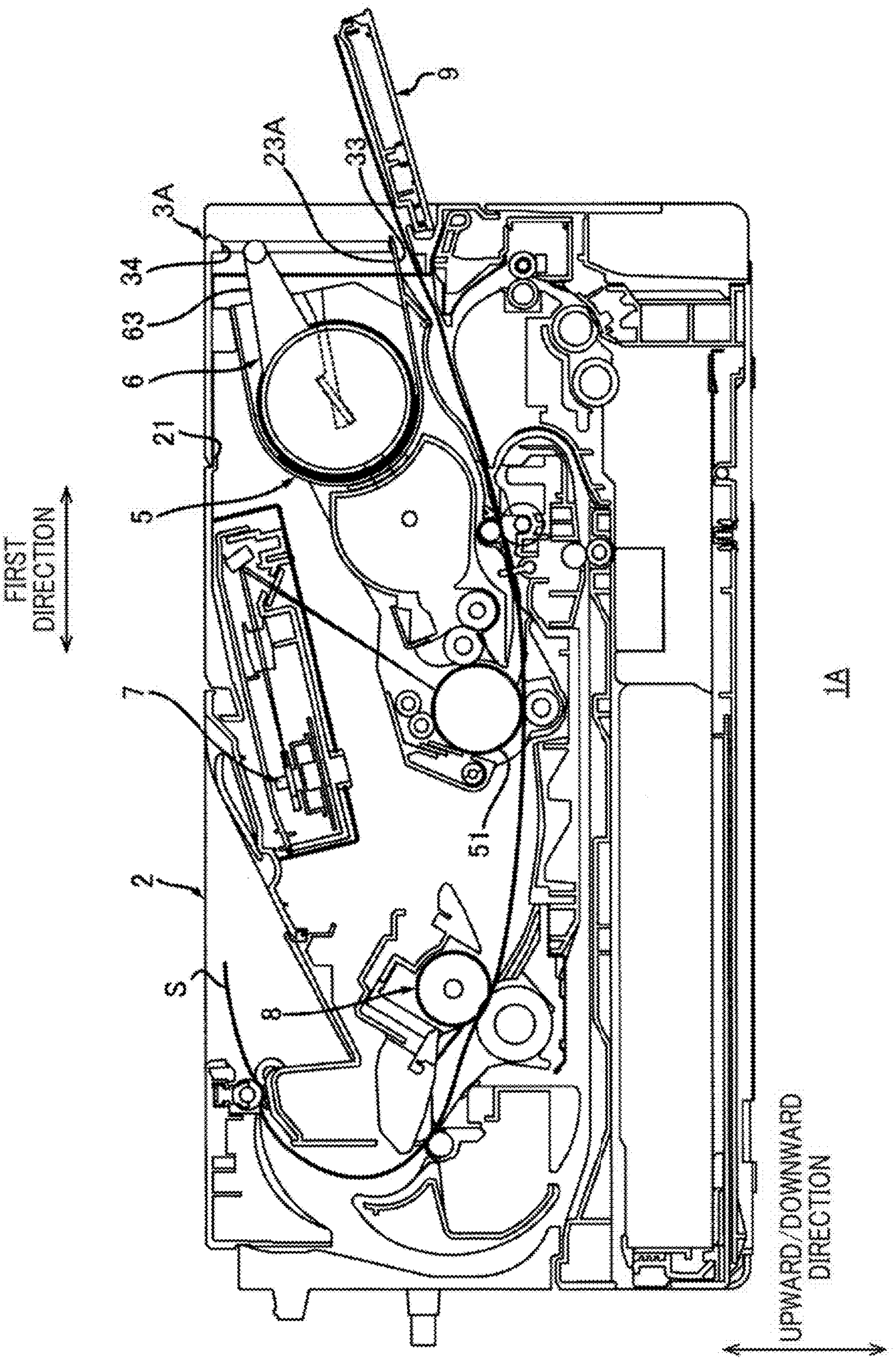
FIG. 18 is a cross-sectional view of an image forming apparatus.

(1) FIG. 18 illustrates an image forming apparatus 1A according to a first modification. The image forming apparatus 1A includes a first cover 3A instead of the first cover 3 in the above-described embodiment. In this first modification, the first cover 3A includes a partition 23A that separates the second opening 34 and the sheet opening 33 from each other.

Figure 19:
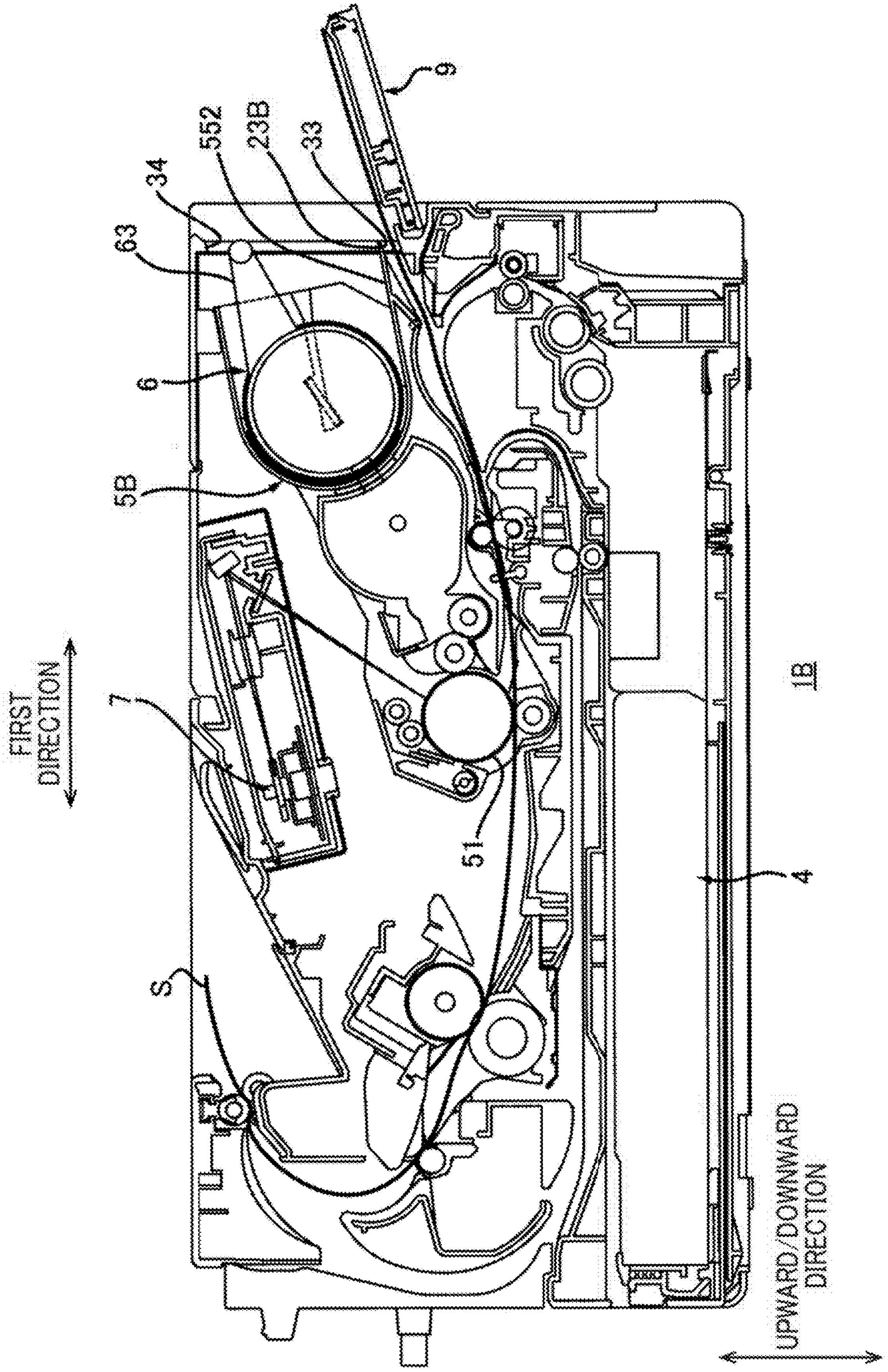
FIG. 19 is a cross-sectional view of an image forming apparatus.

(2) FIG. 19 illustrates an image forming apparatus 1B according to a second modification. The image forming apparatus 1B includes a drum cartridge 5B attachable to the main casing 2 in place of the drum cartridge 5. In this second modification, the drum cartridge 5B includes a partition 23B that separates the second opening 34 and the sheet opening 33 from each other.

What is claimed is:

1. An image forming apparatus comprising:

a main casing having an opening;

a cover movable between:

a closed position in which the cover closes the opening; and an open position in which the first opening is opened;

a drum cartridge comprising a photosensitive drum extending in a longitudinal direction, the drum cartridge being attachable to and detachable from the main casing through the opening in a state where the cover is in the open position; and a toner cartridge configured to accommodate toner therein, the toner cartridge being attachable to and detachable from the drum cartridge, wherein, in a state where the drum cartridge is accommodated in the main casing, the drum cartridge is pivotally movable between:

a drum locking position in which the drum cartridge is locked relative to the main casing; and a drum unlocking position in which the drum cartridge is not locked relative to the main casing, wherein, in a state where the cover is in the first open position and the drum cartridge is in the drum unlocking position, the drum cartridge is detachable from the main casing in a predetermined direction crossing the longitudinal direction, wherein the main casing comprises an abutment portion contacting a part of the drum cartridge when the drum cartridge is moved in the predetermined direction from the drum locking position, and wherein, in a state where the first cover is in the first open position and the drum cartridge is in the drum locking position, the drum cartridge is not detachable from the main casing in the predetermined direction.

2. The image forming apparatus according to claim 1, wherein, in a state where the toner cartridge is attached to the drum cartridge, the toner cartridge is pivotally movable between a first position and a second position, wherein, in a state where the toner cartridge is attached to the drum cartridge and the toner cartridge is in the first position, the toner cartridge is locked relative to the drum cartridge, and wherein, in a state where the toner cartridge is attached to the drum cartridge and the toner cartridge is in the second position, the toner cartridge is not locked relative to the drum cartridge.

3. The image forming apparatus according to claim 2, wherein the toner cartridge comprises a protrusion provided on each end portion of the toner cartridge in the longitudinal direction, wherein the drum cartridge further comprises a locking portion that can be engaged with the protrusion, and wherein the toner cartridge is locked relative to the drum cartridge by engagement of the protrusion and the locking portion with each other.

4. The image forming apparatus according to claim 2, wherein the drum cartridge is pivotally movable between the drum locking position and the drum unlocking position about a pivot axis, wherein the toner cartridge is pivotally movable between the first position and the second position about a pivot axis, and wherein both the pivot axis of the drum cartridge and the pivot axis of the toner cartridge are parallel to the longitudinal direction.

5. The image forming apparatus according to claim 4, wherein the pivot axis of the toner cartridge is closer to the cover than the pivot axis of the drum cartridge is to the cover.

6. The image forming apparatus according to claim 4, wherein the drum cartridge is pivotally movable from the drum locking position toward the drum unlocking position in a first pivot direction, wherein the toner cartridge is pivotally movable from the first position toward the second position in a second pivot direction, and wherein the first pivot direction and the second pivot direction are opposite to each other.

7. The image forming apparatus according to claim 1, wherein the cover comprises a stopper not allowing the drum cartridge to be moved from the drum locking position to the drum unlocking position in a state where the cover is in the closed position.

8. The image forming apparatus according to claim 1, wherein the toner cartridge comprises a handle, and wherein the drum cartridge and the toner cartridge are detachable in the predetermined direction after the drum cartridge is pivotally moved from the drum locking position to the drum unlocking position in response to an operation on the handle.

* * * * *